US010931664B2

(12) United States Patent
Zhang

(10) Patent No.: US 10,931,664 B2
(45) Date of Patent: Feb. 23, 2021

(54) ESTABLISHING ACCESS TO A SECURE NETWORK BASED ON USER-CREATED CREDENTIAL INDICIA

(71) Applicant: NETGEAR, Inc., San Jose, CA (US)

(72) Inventor: Ye Zhang, San Jose, CA (US)

(73) Assignee: NETGEAR, Inc., San Jose, CA (US)

( * ) Notice: Subject to any disclaimer, the term of this patent is extended or adjusted under 35 U.S.C. 154(b) by 43 days.

(21) Appl. No.: 16/037,642

(22) Filed: Jul. 17, 2018

(65) Prior Publication Data

US 2018/0324171 A1   Nov. 8, 2018

Related U.S. Application Data

(60) Continuation of application No. 15/062,583, filed on Mar. 7, 2016, now Pat. No. 10,057,248, which is a
(Continued)

(51) Int. Cl.
  *H04L 29/06*    (2006.01)
  *G06F 21/42*    (2013.01)
(Continued)

(52) U.S. Cl.
  CPC ............ *H04L 63/083* (2013.01); *G06F 21/00* (2013.01); *G06F 21/42* (2013.01); *G06F 21/45* (2013.01);
(Continued)

(58) Field of Classification Search
  CPC .......... G06F 21/00; G06F 21/42; G06F 21/45; G06K 19/06028; G06K 19/06037;
(Continued)

(56) References Cited

U.S. PATENT DOCUMENTS 6,550,685 B1 * 4/2003 Kindberg ......... G06K 19/06028
                                                              235/462.01
8,711,407 B2 * 4/2014 Partridge .............. G06F 21/608
                                                              358/1.14
(Continued)

OTHER PUBLICATIONS

Query Search Report from IP.com (Performed Feb. 27, 2020).*
(Continued)

*Primary Examiner* — Sharon S Lynch
(74) *Attorney, Agent, or Firm* — Norton Rose Fulbright US LLP

(57) ABSTRACT

In various aspects, code-based indicia contain secured network access credentials. In some aspects, a computer processor receives user input that specifies secured network access credentials, and the computer processor creates or modifies credentials for establishing a secured network connection. In these aspects, the computer processor generates code-based indicia that contain at least part of the secured network access credentials. In other aspects, a computer processor scans the code-based indicia and extracts the network access credentials. In these aspects, the computer processor employs the network access credentials to establish the secured network connection. In additional aspects, a network router apparatus renders the code-based indicia to an active display. In further aspects, a network router apparatus conditions grant of network access to a device on receipt from the device of an answer to a security question included in the secured network access credentials.

14 Claims, 16 Drawing Sheets

Related U.S. Application Data division of application No. 13/470,027, filed on May 11, 2012, now Pat. No. 9,280,643.

(51) Int. Cl.
*G06F 21/45* (2013.01)
*G06F 21/00* (2013.01)
*G06K 7/10* (2006.01)
*G06K 19/06* (2006.01)

(52) U.S. Cl.
CPC ... *G06K 7/10544* (2013.01); *G06K 19/06028* (2013.01); *G06K 19/06037* (2013.01); *H04L 63/0428* (2013.01); *H04L 63/08* (2013.01); *H04L 63/102* (2013.01)

(58) Field of Classification Search
CPC . G06K 7/10544; H04L 63/0428; H04L 63/08; H04L 63/083; H04L 63/102
See application file for complete search history.

(56) References Cited

U.S. PATENT DOCUMENTS

| | | | | |
|---|---|---|---|---|
| 8,806,567 B1* | 8/2014 | Venable, Sr. | ....... | H04L 63/0823 726/1 |
| 8,819,444 B2* | 8/2014 | Shahbazi | ....... | H04L 9/0863 713/183 |
| 9,117,242 B1* | 8/2015 | Ellis | ....... | G06Q 40/00 |
| 9,280,643 B2 | 3/2016 | Zhang | | |
| 10,423,950 B2* | 9/2019 | Staflin | ....... | G06Q 20/382 |
| 2003/0009244 A1* | 1/2003 | Engleson | ....... | G06Q 50/22 700/86 |
| 2006/0174121 A1* | 8/2006 | Omae | ....... | H04L 63/0823 713/172 |
| 2007/0220597 A1* | 9/2007 | Ishida | ....... | G06Q 20/12 726/8 |
| 2009/0108057 A1* | 4/2009 | Mu | ....... | H04M 1/72561 235/375 |
| 2009/0222353 A1* | 9/2009 | Guest | ....... | G06Q 20/204 705/17 |
| 2009/0240943 A1* | 9/2009 | Brown | ....... | H04L 63/083 713/171 |
| 2009/0293110 A1* | 11/2009 | Koga | ....... | G06F 21/36 726/6 |
| 2010/0070759 A1* | 3/2010 | Leon Cobos | ....... | H04L 63/0853 713/155 |
| 2010/0241857 A1* | 9/2010 | Okude | ....... | B60R 25/24 713/168 |
| 2010/0321739 A1* | 12/2010 | Amagai | ....... | G06T 3/00 358/3.28 |
| 2011/0002012 A1* | 1/2011 | Amagai | ....... | G06K 19/06046 358/3.28 |
| 2011/0219427 A1* | 9/2011 | Hito | ....... | G06F 21/00 726/3 |
| 2012/0036218 A1* | 2/2012 | Oh | ....... | H04M 1/72525 709/217 |
| 2012/0158922 A1* | 6/2012 | Aggarwal | ....... | H04L 63/104 709/220 |
| 2012/0223132 A1* | 9/2012 | Lim | ....... | H04M 1/2755 235/375 |
| 2012/0240204 A1* | 9/2012 | Bhatnagar | ....... | H04L 63/0428 726/5 |
| 2012/0254768 A1* | 10/2012 | Aggarwal | ....... | G06F 9/44505 715/744 |
| 2012/0300087 A1* | 11/2012 | Shore | ....... | G06Q 10/10 348/207.1 |
| 2013/0054271 A1* | 2/2013 | Langford | ....... | G06Q 50/24 705/3 |
| 2013/0069781 A1* | 3/2013 | Terwilliger | ....... | G06F 16/9554 340/539.13 |
| 2013/0069794 A1* | 3/2013 | Terwilliger | ....... | G06Q 10/08 340/815.45 |
| 2013/0071029 A1* | 3/2013 | Terwilliger | ....... | H04L 67/36 382/183 |
| 2013/0112760 A1* | 5/2013 | Schory | ....... | G06K 19/06037 235/494 |
| 2013/0124855 A1* | 5/2013 | Varadarajan | ....... | G06Q 20/3276 713/155 |
| 2013/0136263 A1* | 5/2013 | Maity | ....... | H04L 63/08 380/278 |
| 2013/0139233 A1* | 5/2013 | Maity | ....... | H04L 63/08 726/7 |
| 2013/0159699 A1* | 6/2013 | Torkkel | ....... | G06F 21/6245 713/155 |
| 2013/0166918 A1* | 6/2013 | Shahbazi | ....... | H04L 63/0815 713/183 |
| 2013/0173484 A1* | 7/2013 | Wesby | ....... | G06Q 30/06 705/318 |
| 2013/0179692 A1* | 7/2013 | Tolba | ....... | H04L 63/08 713/179 |
| 2013/0198004 A1* | 8/2013 | Bradley | ....... | G06Q 30/0267 705/14.64 |
| 2013/0201211 A1* | 8/2013 | Kim | ....... | G06T 11/60 345/632 |
| 2013/0209108 A1* | 8/2013 | Krishnakumar | ....... | H04L 69/14 398/130 |
| 2013/0212289 A1* | 8/2013 | Krishnakumar | ....... | H04L 12/1822 709/228 |
| 2013/0219479 A1* | 8/2013 | DeSoto | ....... | H04W 12/06 726/6 |
| 2013/0262309 A1* | 10/2013 | Gadotti | ....... | G06Q 20/3276 705/44 |
| 2013/0275255 A1* | 10/2013 | Trounce | ....... | G06Q 30/0621 705/26.5 |
| 2013/0276075 A1* | 10/2013 | Gong | ....... | H04W 12/08 726/5 |
| 2013/0278622 A1* | 10/2013 | Sun | ....... | G06Q 20/22 345/589 |
| 2014/0246488 A1* | 9/2014 | Terwilliger | ....... | H04L 67/36 235/375 |
| 2014/0310185 A1* | 10/2014 | Staflin | ....... | H04L 63/08 705/71 |
| 2015/0088758 A1* | 3/2015 | Varadarajan | ....... | G06Q 20/3276 705/71 |
| 2016/0217356 A1* | 7/2016 | Wesby | ....... | H04L 9/3271 |

OTHER PUBLICATIONS

Search Query Report from IP.com (performed Jun. 11, 2020).*
Search Query Report from IP.com (performed Oct. 7, 2020) (Year: 2020).*

* cited by examiner

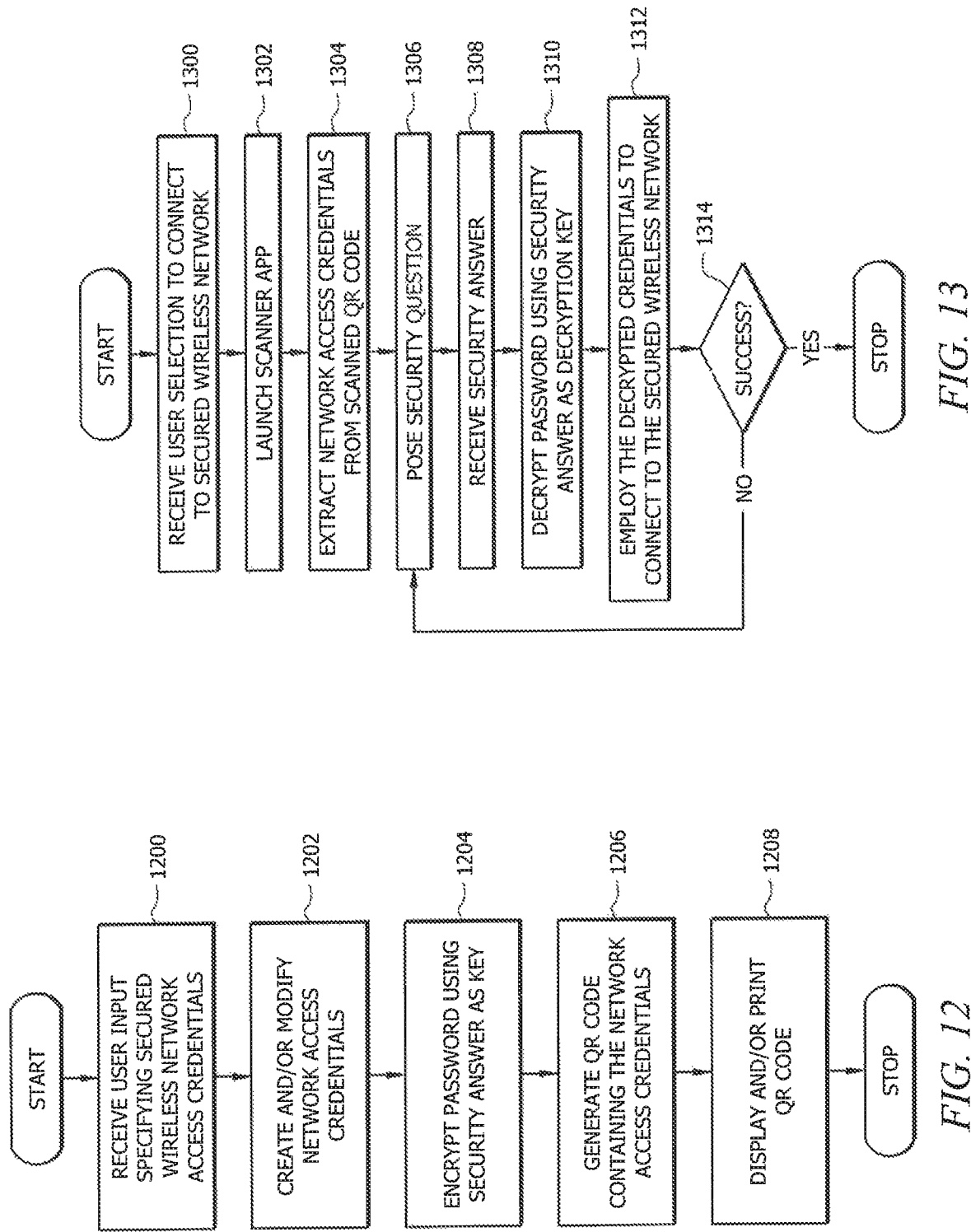

ESTABLISHING ACCESS TO A SECURE NETWORK BASED ON USER-CREATED CREDENTIAL INDICIA

CROSS-REFERENCE TO RELATED APPLICATION

This application is a continuation of U.S. patent application Ser. No. 15/062,583, filed Mar. 7, 2016, entitled "ESTABLISHING ACCESS TO A SECURE NETWORK BASED ON USER-CREATED CREDENTIAL INDICIA", which is a division of U.S. patent application Ser. No. 13/470,027, filed May 11, 2012, issued Mar. 8, 2016, as U.S. Pat. No. 9,280,643, entitled "ESTABLISHING ACCESS TO A SECURE NETWORK BASED ON USER-CREATED CREDENTIAL INDICIA", the disclosures of which are incorporated herein in their entirety.

TECHNICAL FIELD

The present disclosure generally relates to establishing user access to a secure network. More particularly, the present disclosure relates to establishing user access to a secure network based on user-created credential indicia.

BACKGROUND OF THE DISCLOSURE

Some secure network devices, such as network routers and the like, may have predefined names and passwords for establishing a connection between an end user's computer and/or establishing end user access to the secure network. For convenient retrieval, the network names and passwords are sometimes printed on exterior labels on the secure network device or contained in associated documentation. Network connection applications, such as NETGEAR™ GENIE™, permit users to change the network name and/or password for establishing a connection with or access to the secured network. However, in the event the user changes the network name and/or password, then the information printed on the exterior of the router is no longer correct. In that event, retrieving the necessary network access credentials may be difficult and time consuming. This difficulty is exacerbated where the user makes mistakes in recording the network name and/or password for subsequent network access or misplaces the access credential information.

Code-based indicia, such as a barcode, matrix code, QR CODE™, etc., is an optical, machine-readable representation of data. Originally, such indicia represented data by varying the widths and spacings of parallel lines. These types of indicia may be referred to as linear or one-dimensional (1D). Later, code-based indicia evolved into rectangles, dots, hexagons and other geometric patterns in two dimensions (2D). 2D systems use a variety of symbols, and are also known as matrix codes. Code-based indicia originally were scanned by special optical scanners called readers; later, scanners and interpretive software became available on devices including desktop printers and smartphones.

SUMMARY OF THE DISCLOSURE

In various aspects, code-based indicia contain secured network access credentials. In some aspects, a computer processor receives user input that specifies secured network access credentials, and the computer processor creates or modifies credentials for establishing a secured network connection. In these aspects, the computer processor generates code-based indicia that contain at least part of the secured network access credentials. In other aspects, a computer processor scans the code-based indicia and extracts the network access credentials. In these aspects, the computer processor employs the network access credentials to establish the secured network connection. In additional aspects, a network router apparatus renders the code-based indicia to an active display. In further aspects, a network router apparatus conditions grant of network access to a device on receipt from the device of an answer to a security question included in the secured network access credentials.

In one aspect, a system for generating code-based indicia comprising secured network access credentials is disclosed. The system comprises a user interface whereby a computer processor receives user input specifying secured network access credentials. A network connection application causes the computer processor to create and/or modify the secured network access credentials according to the user input. An indicia generation application causes the computer processor to generate the code-based indicia comprising at least part of the secured network access credentials.

In another aspect, an apparatus for establishing a secured network connection comprises an indicia scanning application whereby a computer processor performs a scan of code-based indicia containing network access credentials for establishing the secured network connection. A network access credential extraction application causes the computer processor to extract the network access credentials from results of the scan. A network connection application causes the computer processor to employ the network access credentials to establish the secured network connection.

In an additional aspect, a network router apparatus comprises at least one antenna and a network interface connected to a communications network. One or more computer processors are connected to the network interface and the at least one antenna. A computer memory is connected to the one or computer processors and has stored therein secured network access credentials and one or more applications whereby the one or more computer processors is rendered responsive to receipt from a device, over the antenna, of the network access credentials to perform a grant of network access to the device and carry out network routing operations with respect thereto. An active display is connected to the one or more computer processors. The computer memory has stored therein code based indicia containing the secured network access credentials, and the one or more computer processors are operably connected to render the code based indicia to the active display.

In a further aspect, a network router apparatus comprises at least one antenna and a network interface connected to a communications network. One or more computer processors is connected to the network interface and the at least one antenna. A computer memory is connected to the one or computer processors and having stored therein secured network access credentials and one or more applications whereby the one or more computer processors is rendered responsive to receipt from a device, over the antenna, of the network access credentials to perform a grant of network access to the device and carry out network routing operations with respect thereto. The network access credentials include an answer to a security question. The one or more applications render the one or more processors responsive to: (a) receive another answer to the security question from the device over the antenna; (b) perform a determination whether the answer to the security question received from the device matches the answer to the security question included in the secured network access credentials stored in the computer memory; and (c) condition the grant of network access on results of the determination.

In another aspect, a method of generating code-based indicia containing secured network access credentials comprises receiving user input specifying secured network access credentials. Secured network access credentials are created or modified according to the user input. Code-based indicia containing at least part of the secured network access credentials are generated.

In an additional aspect, a method of establishing a secured network connection comprises performing a scan, by a computer processor, of code-based indicia containing network access credentials for establishing the secured network connection. The computer processor extracts the network access credentials from results of the scan, and employs the network access credentials to establish the secured network connection.

In a further aspect, a method of operation for a network router apparatus comprises responding to receipt from a device, over an antenna, of network access credentials by performing a grant of network access to the device and carrying out network routing operations with respect thereto. Code based indicia stored in a computer memory of the network router apparatus are accessing, wherein the code based indicia contain secured network access credentials. The code based indicia are rendered to an active display of the network router apparatus.

In another aspect, a method of operation for a network router apparatus comprises responding to receipt from a device, over an antenna, of network access credentials by performing a grant of network access to the device and carrying out network routing operations with respect thereto. Code based indicia stored in a computer memory of the network router apparatus are accessed, wherein the code based indicia contain secured network access credentials, include an answer to a security question. Another answer to the security question is received from the device over the antenna. A determination is performed whether the answer to the security question received from the device matches the answer to the security question included in the secured network access credentials stored in the computer memory. The grant of network access is conditioned on results of the determination.

In yet another aspect, an apparatus for establishing a secured network connection, has an active display, and a non-transitory computer readable medium having recorded therein code-based indicia containing secured network access credentials. A computer processor is connected to the non-transitory computer readable medium. A network connection application recorded in the computer readable medium, configures the computer processor to respond to user selection to establish a secured network connection provided by a network router by transmitting a notification to the router and rendering the code-based indicia to the active display.

In a further aspect, a network router apparatus has an antenna, a network interface connected to a communications network, and an imaging device. One or more computer processors is connected to the network interface and the antenna. A non-transitory computer readable medium connected to the one or computer processors has stored therein secured network access credentials and one or more applications. The applications render the one or more computer processors responsive to receipt from a device, over the antenna, of a notification that it would like to connect to the communications network, by employing the imaging device to perform a scan of code-based indicia, extracting network access credentials from results of the scan, and performing an authentication process. The authentication process includes verification that the extracted credentials match the secured network access credentials stored in the computer-readable medium, Grant of network access to the device is conditioned on results of the authentication process.

In an additional aspect, a method for establishing a secured network connection, includes receiving a user selection, by a computer processor, to establish a secured network connection provided by a network router. The computer processor responds to the user selection by; (a) transmitting a notification to the network router; (b) accessing a non-transitory computer readable medium having recorded therein code-based indicia containing secured network access credentials; and (c) rendering the code-based indicia to an active display.

In another aspect, a method of operation for a network router apparatus, includes accessing a non-transitory computer readable medium having stored therein secured network access credentials. A notification is received from a device, over an antenna, that the device would like to connect to the communications network. The method includes responding to receipt of the notification by employing an imaging device of the network router apparatus to perform a scan of code-based indicia, and extracting network access credentials from results of the scan. An authentication process is performed that includes verification that the extracted credentials match the secured network access credentials stored in the computer-readable medium. Grant of network access to the device is conditioned on results of the authentication process.

The foregoing has outlined rather broadly the features and technical advantages of the present invention in order that the detailed description of the invention that follows may be better understood. Additional features and advantages of the invention will be described hereinafter Which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying figures, in which:

FIG. 12 is a flow diagram illustrating another method of generating code-based indicia containing secured network access credentials in accordance with the present disclosure;

FIG. 13 is a flow diagram illustrating another method of establishing a secured network connection in accordance with the present disclosure;

DETAILED DESCRIPTION OF THE DISCLOSURE

Figure 1:
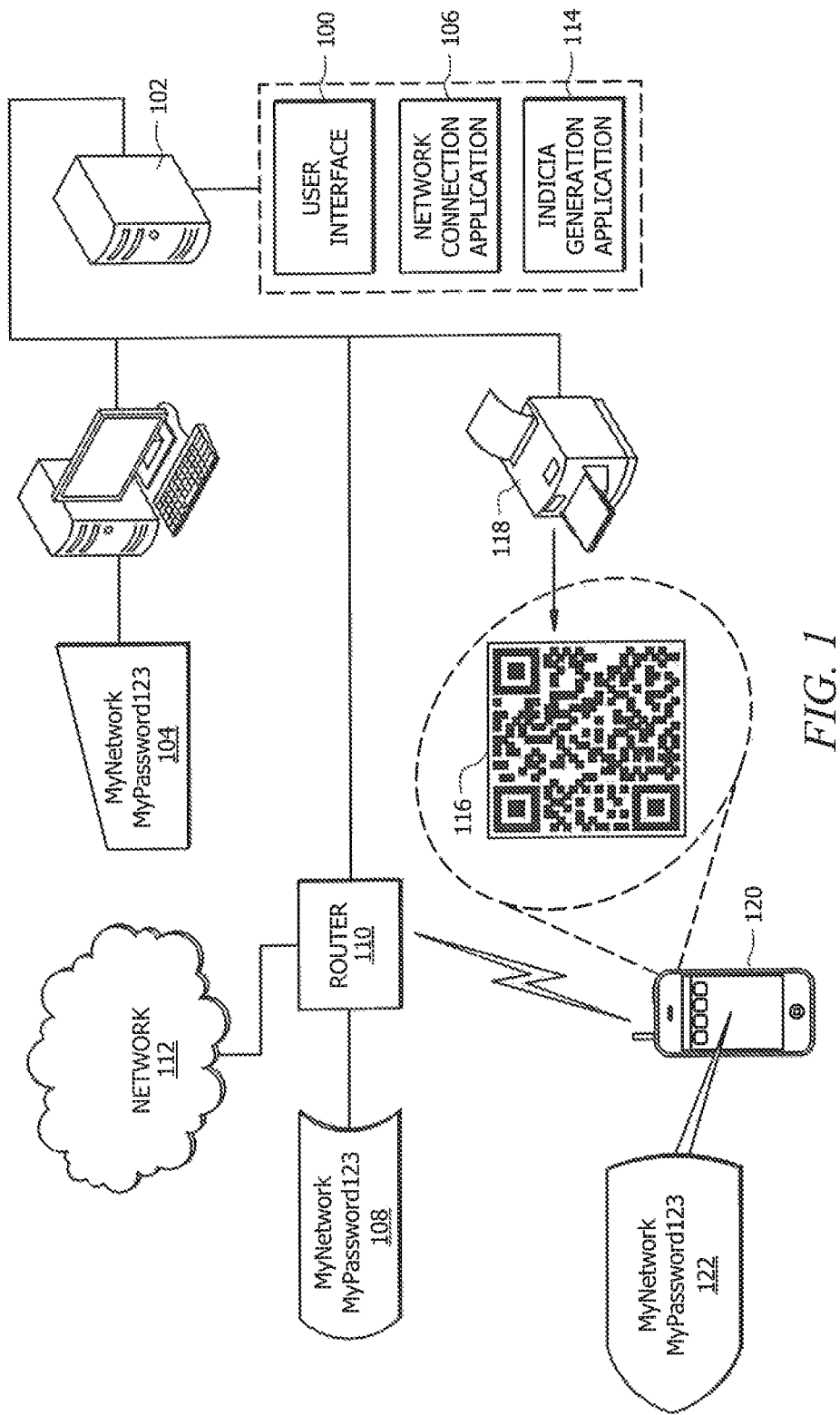
FIG. 1 is a functional block diagram illustrating an apparatus for generating indicia containing network access credentials in accordance with the present disclosure.

FIG. 1 illustrates a system for generating indicia comprising network access credential information in accordance with the present disclosure. The network access credential information is created, updated, and/or modified in response to user input, and therefore, is unique to both the secure network and that user. According to the embodiment illustrated at FIG. 1, the indicia is code-based, being represented as QR CODE™, barcode, or other 2D code-based representation. The system includes a user interface 100 whereby a computer processor 102 receives user input 104. User input 104 comprises information relating to secure network access credentials, such as, e.g., user-created password, user-created network name, user-created security questions and answers, and the like. The user interface 100 may be a graphical user interface (GUI) similar to the GUI of NETGEAR™ GENIE™, or any other network connection application. The system also includes a network connection application 106 (e.g., NETGEAR™ GENIE™) whereby the computer processor 102 creates, updates, and/or modifies secured network access credentials 108 according to the user input 104. It should be readily understood that the secured network access credentials 108 may be stored in memory of a secure network device, such as a wireless router 110, that provides connection to a communications network 112, such as a 3G, 3GPP, LTE-based network. Network 112 may provide a combination of wired and wireless communication between network devices and may facilitate communication over licensed and unlicensed bands (e.g., WiFi, Bluetooth, etc). The system further includes an indicia generation application 114 whereby the computer processor 102 generates indicia 116. Indica 116 are generated by application 114 based on information in user input 104 and comprises or represents at least part of the secured network access credentials 108.

In some embodiments, the indicia generation application 114 causes the computer processor 102 to print the indicia 116 via a connected printer 118. The user may then place the printed hardcopy of the indicia in a convenient place, such as by attaching it to a wall near the router 110, inserting it into a transparent, plastic sleeve attached to the router 110, or attaching it to the router 110. Conveniently, the user may thereafter employ an end user device 120, such as a smart phone or tablet, to scan the indicia 116 and generate a display 122 of the secured network access credentials 108 contained in the indicia 116. One skilled in the art will recognize that scanning applications are readily available for use by smart phones to scan matrix indicia, such as QR CODE™ indicia. Accordingly, in a presently preferred embodiment, the indicia 116 correspond to matrix indicia, such as QR CODE™ indicia. However, it should be readily understood that other types of indicia may be generated in other embodiments in accordance with the present disclosure.

In operation, various embodiments of the system may trigger generation and/or printing of the indicia in various ways depending particularly on implementation of the user interface 100. For example, in some embodiments, the computer processor 102 may enable a user interface input component in response to generation of the indicia 116 in computer memory. The user may thereafter interact with the input component to make a selection for the computer processor 102 to print the indicia 116. For example, a button or icon to print the indicia 116 may appear or become active after the user has selected to apply the input 104 in creating or modifying the network access credentials 108. In additional or alternative embodiments, the computer processor 102 may enable a user interface input component in response to the computer processor 102 creating and/or modifying the network access credentials 108 according to the user input 104. In this case, the user may interact with the component to make a selection for the computer processor 102 to generate the indicia 116 in computer memory, and the computer processor 102 may automatically print the indicia 116 in response to the selection by the user to generate the indicia 116 in computer memory. In other embodiments, the computer processor 102 may automatically generate the indicia 116 in computer memory and print the indicia 116 in response to the computer processor 102 creating and/or modifying the network access credentials 108 according to the user input 104.

As an alternative to printing the indicia. 116, or supplemental thereto, the computer processor 102 may cause the indicia 116 to be displayed on a network device, such as router 110. In some embodiments, the computer processor 102 may cause the indicia 116 to be displayed by transmitting the indicia 116 to the router 110, where data necessary for displaying indicia 116 is transmitted between the network devices over a network connection. In this case, the router 110 may have an active display on which it displays the indicia 116. It is envisioned that the active display may be a liquid crystal (LCD) display or any other type of active display. It is also envisioned that the router 110 may provide a user interface, such as a dedicated button or touch screen menu option to trigger display of the indicia 116. Alternatively, the router 110 may persistently display the indicia 116.

In operation, the computer processor 102 may cause one or more router computer memory locations to be overwritten with data corresponding to the indicia 116. These memory locations may be designated for containing data for display by the router 110 on the active display. In some embodiments, the router 110 may be configured to overwrite the designated memory locations with indicia data transmitted by the computer processor 102. In other embodiments, the computer memory of the router 110 may be subject to being directly overwritten by the computer processor 102. It is envisioned that the computer processor 102 may automatically generate the indicia 116 in computer memory upon creating and/or modifying the network access credentials 108 according to the user input 104, and that the computer processor 102 may automatically transmit the indicia data to the router 110 upon generation of the indicia data in computer memory. As will be discussed in greater detail, the end user may utilize a device to scan or otherwise read and interpret the indicia displayed by the network device to extract readable access credentials, such as network name and password, and additionally may be prompted to provide additional security information to facilitate network access.

As an alternative to printing or displaying the indicia 116, or supplemental thereto, the computer processor 102 may employ the user interface 100 to receive user input specifying a destination, such as an email address or a telephone number, and transmit the indicia to the destination. In the case that the destination is a telephone number, it should be appreciated that the computer processor 102 may transmit a short message service (SMS) picture message containing the indicia 116. In the case that the destination is an email address, it should be understood that the computer processor 102 may transmit an email having the indicia 116 attached as an attachment. Such transmission of the indicia 116 may facilitate display or print of the indicia by another device. It is also envisioned that a device receiving the indicia in this manner may be configured to extract the credentials and generate the display 122 of the credentials to the user.

Figure 2:
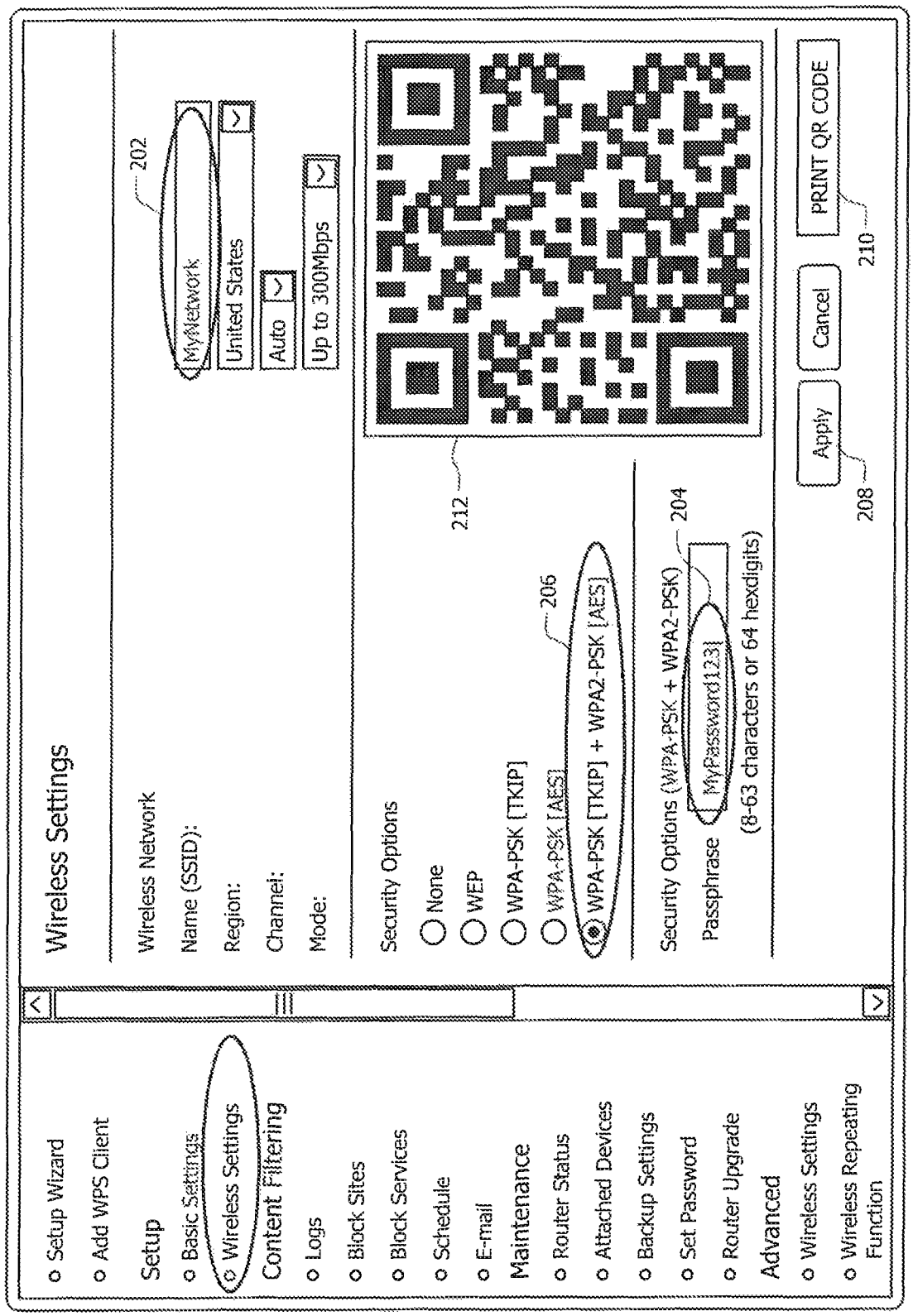
FIG. 2 is a graphical illustration presenting a view of a user interface of an apparatus for generating code-based indicia containing network access credentials in accordance with the present disclosure.

FIG. 2 illustrates a user interface 200 that facilitates creation of indicia comprising network access credentials in accordance with the present disclosure. The user interface 200 may enable a computer processor to receive user input specifying secured network access credentials, such as a network name 202 and a password 204 in accordance with a security option 206 selected by the user. The user interface 200 may be a graphical user interface (GUI) similar to the GUI of NETGEAR™ GENIE™, or any other network connection application. The user interface 200 may supply the inputs to a network connection application (e.g., NETGEAR™ GENIE™) whereby the computer processor creates, updates, and/or modifies secured network access credentials in response to user input with a credential creation/modification creation control 208. The user interface 200 may additionally include an indicia creation/transmission control 210 for triggering indicia creation and/or transmission. In some embodiments, it is envisioned that a display region 212 may be provided for displaying instructions and/or the indicia.

In operation, the user interface may trigger generation and/or transmission of the indicia in response to various events. For example, in some embodiments, the indicia generation/transmission control 210 may become active or appear upon the user interacting with the credential creation/modification control 208. In some embodiments, the indicia generation/transmission control 210 may initially bear a label indicating that it may be used to generate the indicia, and instructions may appear in display region 212 in this regard. Then, upon user interaction with the indicia generation/transmission control 210, the instructions in the display region 212 may be replaced with a display of the generated indicia, and the label born by indicia generation/transmission control 210 may change to indicate an action that may be taken to transmit the indicia. For example, the indicia generation/transmission control 210 may indicate that the user may print the indicia by transmitting the indicia to a printer. Alternatively, the indicia generation/transmission control 210 may offer the user an option to transmit the indicia by email or text message to a user specified destination. It is envisioned that additional or alternative controls, such as drop down menus, check boxes, radio buttons, or other user interface controls may be provided to present these various options. Additional or alternative instructions may be displayed in display region 212 in other embodiments.

In additional or alternative embodiments, the indicia may be generated automatically upon user interaction with the credential creation/modification control 208, and the indicia generation/transmission control 210 may then activate to offer the user options for transmitting the indicia. In other embodiments, the user may interact with the indicia generation/transmission control 210 to make a selection for the computer processor to generate the indicia in computer memory, and the computer processor may automatically print or otherwise transmit the indicia in response to the selection by the user to generate the indicia in computer memory. In other embodiments, the computer processor may automatically generate the indicia in computer memory and print or otherwise transmit the indicia in response to the computer processor creating and/or modifying the network access credentials upon user interaction with the credential creation/modification control 208.

As an alternative to printing the indicia, or supplemental thereto, the computer processor may cause the indicia to be actively displayed by transmitting the indicia to the router implementing the secured network connection. In this case, the capabilities of the router may be automatically detected by the computer processor, and operation of the user interface may be modified if such a router is connected. For example, it is envisioned that the router may have a dedicated button or menu option to trigger display of the indicia. Alternatively, the router may persistently display the indicia. Thus, in some embodiments, the user interface may present options to the user for configuring how the router will display the indicia. Presentation of an option to print the indicia may also be contingent on the router capabilities. For example if the router is able to display the indicia, then the user interface may not display the option to print the indicia. In some embodiments, the user interface may display options for configuring the router display in place of the options to print or otherwise transmit the indicia. In other embodiments, the indicia may be automatically transmitted to the router, and the user interface may selectively display a message in display region 212 notifying the user of the transmission.

Figure 3:
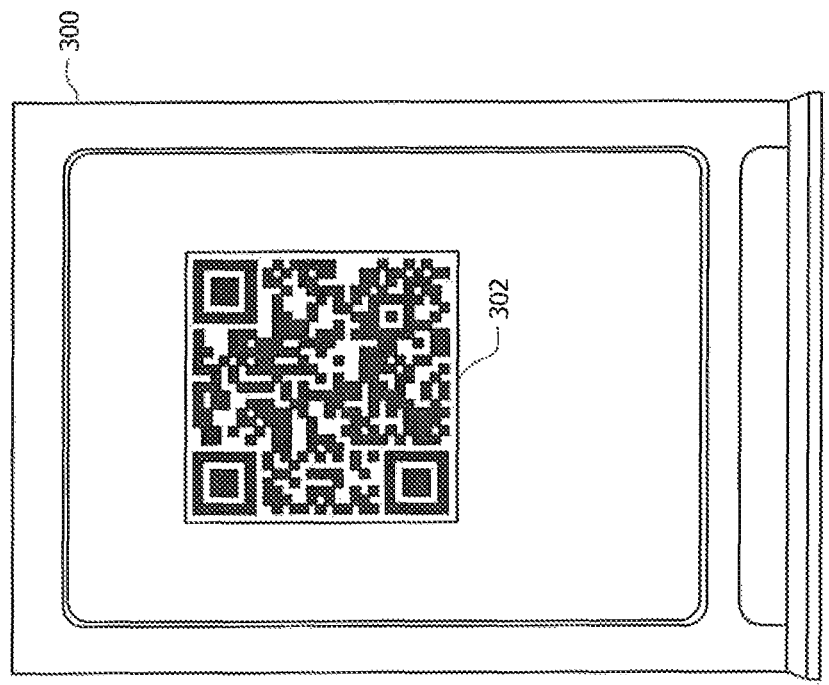
FIG. 3 is a graphical illustration presenting a view of a router having an active display of code-based indicia containing network access credentials in accordance with the present disclosure.

FIG. 3 presents a view of a router 300 having an active display 302 of an indicia containing network access credentials in accordance with the present disclosure. It is envisioned that the active display 302 may be a liquid crystal (LCD) display or any other type of active display. The indicia may be stored in computer memory of the router 300, and rendered to the active display 302 by a computer processor of the router 300. In some embodiments, the computer memory of the router 300 may be factory programmed with the indicia data. In additional or alternative embodiments, the computer processor of the router 300 may receive the indicia data over a connection to a remote computer processor and store the data in the memory. In some embodiments, the computer processor of the router 300 may be configured to overwrite the designated memory locations with indicia data transmitted by the remote computer processor. In other embodiments, the computer memory of the router 300 may be subject to being directly overwritten by the remote computer processor. In still other embodiments, the computer memory of the router 300 may store an application run by the computer processor of the router 300 to receive the network access credentials over a connection to the remote computer processor, generate the indicia data, and store the generated indicia data in the designated locations of the computer memory. It is also envisioned that the router 300 may have a dedicated button or menu option to trigger display of the indicia on the active display 302. Alternatively, the router 300 may persistently display the indicia on the active display 302.

Figure 4:
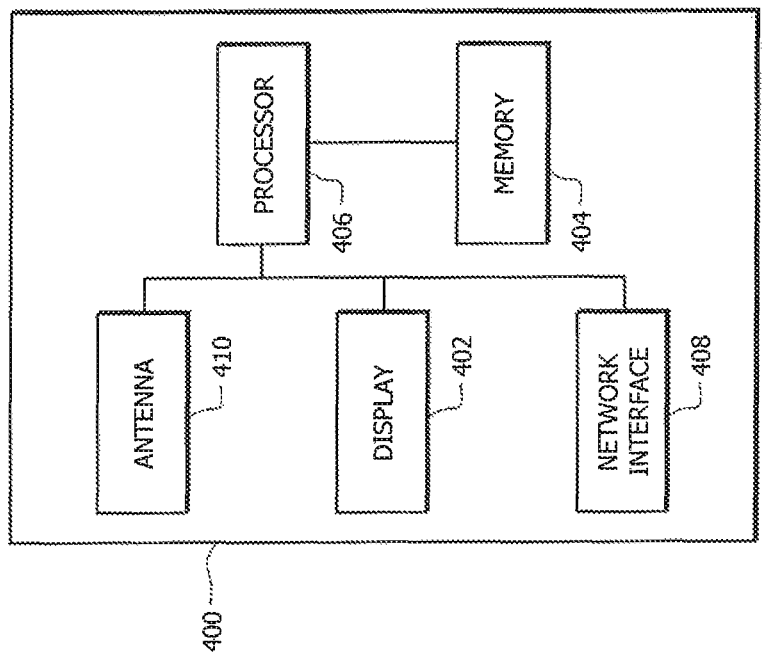
FIG. 4 is a functional block diagram illustrating a router having an active display of code-based indicia containing network access credentials in accordance with the present disclosure.

FIG. 4 illustrates a router 400 having an active display 402 of an indicia containing network access credentials in accordance with the present disclosure. It is envisioned that the active display 402 may be a liquid crystal (LCD) display or any other type of active display. The indicia may be stored in computer memory 404 of the router 400, and rendered to the active display 402 by a computer processor 406 of the router 400. In some embodiments, the computer memory 404 of the router 400 may be factory programmed with the indicia data. In additional or alternative embodiments, the computer processor 406 of the router 400 may receive the indicia data over network interface 408 and/or antenna 410 and store the data in the memory. In some embodiments, the computer processor of the router 400 may be configured to overwrite the designated memory locations with indicia data transmitted by a remote computer processor. In other embodiments, the computer memory of the router 400 may be subject to being directly overwritten by the remote computer processor. In still other embodiments, the computer memory 404 of the router 400 may store an application run by the computer processor 406 of the router 400 to receive the network access credentials over network interface 408 and/or antenna 410, generate the indicia data, and store the generated indicia data in the designated locations of the computer memory 404. It is also envisioned that the router 400 may have a dedicated button or menu option to trigger display of the indicia on the active display 402. Alternatively, the router 400 may persistently display the indicia on the active display 402.

Figure 5:
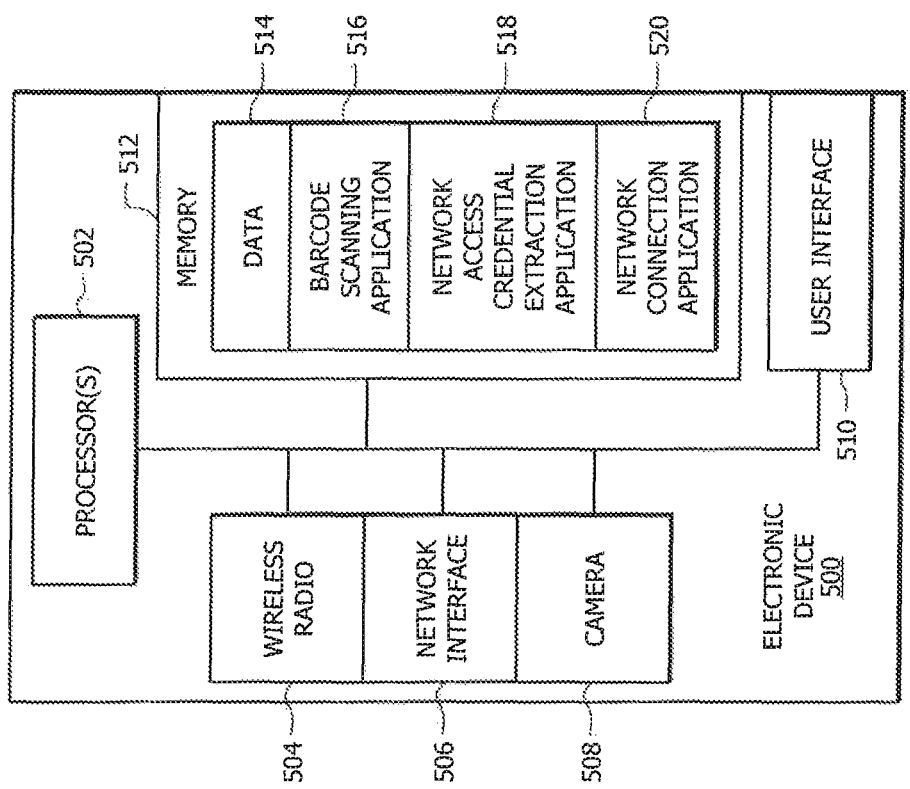
FIG. 5 is a functional block diagram illustrating an apparatus for establishing a secured network connection in accordance with the present disclosure.

FIG. 5 illustrates an apparatus for establishing a secured network connection in accordance with the present disclosure. Electronic device 500 includes various components common to many typical smart phones, tablet computers, notebook and netbook computers, computers, and the like. Devices, such as electronic device 500 include the processing power, memory, and programming to perform complex tasks, run complex programs, and interact substantially with a user.

The functionality and operations of electronic device 500 are controlled and executed through processor(s) 502. Processor(s) 502 may include one or more core processors, central processing units (CPUs), graphical processing units (GPUs), math co-processors, and the like. Processor(s) 500 executes program logic, whether implemented through software stored in a memory 512 or in firmware in which logic is integrated directly into integrated circuit components. Electronic device 500 may communicate wirelessly through various radios, such as wireless radio 504, such as one or more of wireless wide area network (WWAN) radios and wireless local area network (WLAN) radios, such as WIFI™ radios, BLUETOOTH® radios, and the like. If a WWAN radio is included as one of the radios in wireless radio 504, communication would generally be allowed to communicate over a long range wireless communication network such as 3G, 4G, LTE, and the like, Various WLAN radios, such as WIFI™ radios, BLUETOOTH® radios, and the like, would allow communication over a shorter range. Electronic device 500 may also provide communication and network access through a wired connection with network interface 506. The wired connection may connect to the publicly-switch telephone network (PSTN), or other communication network, in order to connect to the Internet or other accessible communication network. Electronic device may additionally provide an accessory, such as camera 508, that may be used to scan an indicia as will be readily appreciated by those skilled in the art.

Under control of processor(s) 502, program logic stored on memory 512, including data 514, indicia scanning application 516, network access credential extraction application 518, network connection application 520, and other applications provides functionality of electronic device 500, including communications, Internet access, and execution of various programs for productivity, entertainment, and the like. Applications stored in memory 512 may, when executed by processor(s) 500, operate calendar programs, game programs, list programs, social media programs, web browsers, and the like. Such operating applications are displayed visually to the user via user interface component 510. The user interface component 510 includes various hardware and software applications that control the rendering of visual information onto the display screen of the mobile device (not shown). The user interface component 510, under control of the processor(s) 500, controls and operates all forms of interfaces between the user and electronic device 500. As such, when electronic device 500 is implemented using a touch screen display, user interface component 510 may read the user's input and finger motions on the touch screen and translates those movements or gestures into electronic interface navigational commands and data entry. Various aspects of user interface component 510 also will receive the rendered visual data through processing, controlled by processor(s) 502, and display that visual information on the display. During input to a touch screen device, the user interface component 510 may be receiving and analyzing input data from a user's finger movements and gestures on the display screen. It may also be receiving data from the processor(s) 502 in the form of processed visual or sound data to be output by display to the user, some of which may be to reflect movement of screen objects in response to the user's finger movements.

Using the indicia scanning application 516, the computer processor(s) 502 may perform a scan of an indicia containing network access credentials for establishing the secured network connection. In some embodiments, the indicia scanning application 516 may be triggered or launched by a user interacting with a control displayed via user interlace 510 during employment by the user of the network connection application 520. Then the user may employ the launched indicia scanning application 516 to operate camera 508 to scan the indicia containing the network access credentials.

Network access credential extraction application 518 may configure the computer processor(s) 502 to extract the network access credentials from results of the scan. For example, the network access credential extraction application 518 may receive text data from indicia scanning application 516, and employ a text recognition process to identify the name of the network and the password. In some embodiments, a keyword, such as "name" or "ID", may be used to tag the name of the network connection to facilitate recognition of the name of the connection, and another keyword, such as "password," may be used to tag the password to facilitate recognition of the password. In some embodiments, the network access credential extraction application 518 may then place the extracted password in a password text field of network connection application 520.

In some embodiments, the network access credential extraction application 518 may check to determine whether the extracted name of the network connection matches the name of the network connection to which the user wishes to establish the connection. If the names do not match, an error may be reported. Thus, in some embodiments, the extraction of the password and/or placement of the extracted password into the password text field of the network connection application 520 may be conditioned on a successful match of the network name to the name of the targeted network connection.

The network connection application 520 configures the computer processor(s) 502 to employ the network access credentials to establish the secured network connection. For example, in some embodiments, the network connection application 502 may be similar to a network connection wizard, such as NETGEAR™ GENIE™ mobile. However, the network connection application 520 has one or more user interface controls to allow the user to interact via the user interface 510 to launch the indicia scanning application 516. Additionally, the network connection application 520 is interfaced with the network access credential extraction application 518 to receive therefrom the network access credentials, such as by placement of the password into a password text field of the network connection application 520. The network connection application 520 may pass the name of the network connection targeted by the user to the network access credentials extraction application for use as described above.

In operation, the computer processor(s) 502 may launch the indicia scanning application 516 in response to the user selection to scan an indicia containing the network access credentials for establishing the secured network connection. In some embodiments, the user interface 510 may, under control of the computer processor(s) 502, prompt the user to make the user selection. In some of these embodiments, the computer processor(s) 502 may employ the user interface 510 to receive a user selection to establish the secured network connection, and the prompting may occur in response to receiving the user selection to establish the connection. The network connection application 520 configures the computer processor(s) 502 to employ the network access credentials to establish the connection for the electronic device 500 device in a manner that will be readily appreciated by one skilled in the art.

Figure 6:
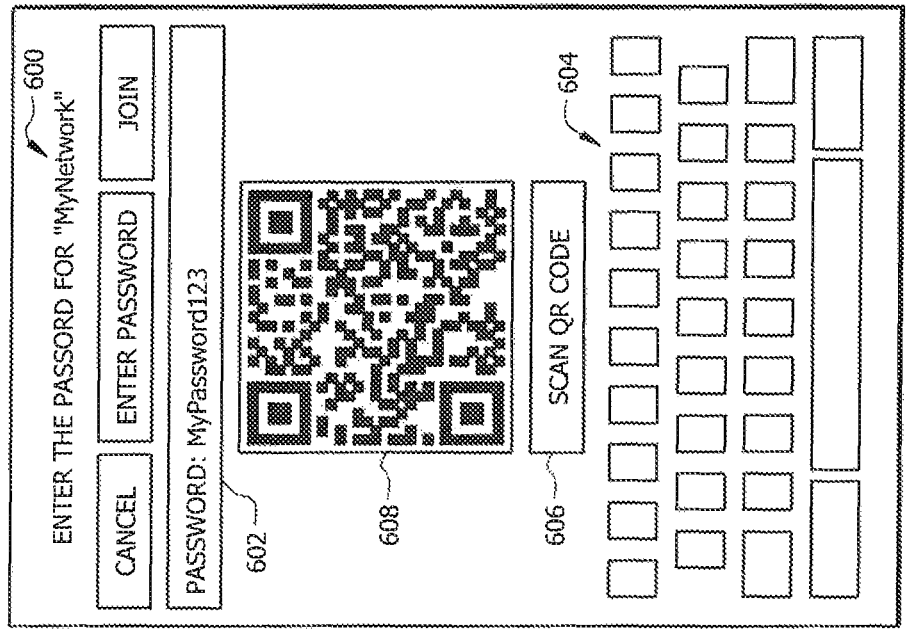
FIG. 6 is a graphical illustration presenting a view of a user interface of an apparatus for establishing a secured network connection in accordance with the present disclosure.

FIG. 6 presents a view of a user interface of an apparatus, such as a mobile device, for establishing a secured network connection in accordance with the present disclosure. As will be readily appreciated, a user of the mobile device may be presented with such a user interface after selecting an option to connect to a particular secured network connection that was detected by the device. The user interface may have features such as an area 600 displaying the name of the network connection point to which the user is trying to establish the secure connection and controls for doing so, and a text field 602 for entering a password needed to establish the secure connection. Additional features provided may be a keyboard 604 or other user interface controls for entering text manually into the text field 602. An additional control of the user interface may be an indicia scanning button 606 for launching an indicia scanning application as discussed above. A further feature of the user interface may be a display region 608 that may initially display instructions to a user regarding an option to launch the indicia scanning application. It is envisioned that contents of display region 608 may change upon scan of the indicia to display results of the scan, such as the indicia, extracted credentials, and/or an error message.

In operation, it is envisioned that prompting may occur in response to receiving a user selection to establish the connection. A computer processor of the mobile device may employ the user interface to receive a user selection to establish the secured network connection. The display region 608 and/or a label of button 606 may then prompt the user to make another user selection to scan the indicia, and the computer processor may employ an indicia scanning application of the mobile device to interface with a camera of the mobile device in performing the scan of the indicia. A network access credential extraction application may cause the computer processor to locate a password in the results of the scan and place the password into a network password text field 602 of the user interface of the network connection application. The computer processor may then employ the network access credentials to establish the connection for the mobile device.

Figure 7:
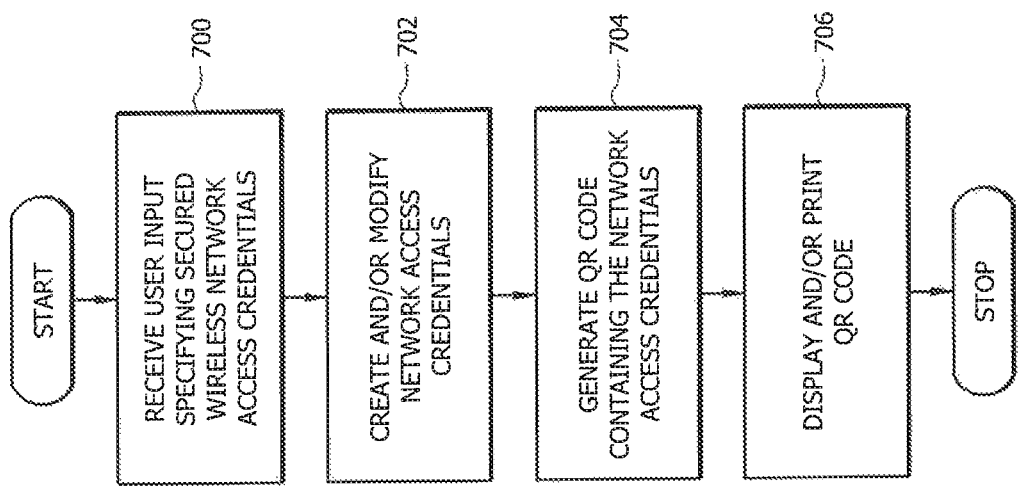
FIG. 7 is a flow diagram illustrating a method of generating code-based indicia containing secured network access credentials in accordance with the present disclosure.

FIG. 7 illustrates a method of generating an indicia containing secured network access credentials in accordance with the present disclosure. Beginning at step 700, user input is received that specifies secured network access credentials, such as a name and password for the secured network connection. Then, at step 702, secured network access credentials are created and/or modified according to the user input. For example, a new network ID and password, such as a WEP key or the like, may be transmitted to a network router and stored therein as the credentials needed to gain access to the network via the router and establish a network connection via the router. Additionally, at step 704, code-based indicia are generated that contain at least part of the secured network access credentials. For example, the keywords "Name" and "Password" may be used to tag the credentials provided by the user, and the tagged text may be encoded into a indicia, such as a QR CODE™. Then, at step 706, the indicia may be printed and/or transmitted.

In some embodiments, a user interface input component may be enabled at step 704 in response to the generating the indicia. This user interface input component may allow the user to make a selection to print the indicia, and the printing of the indicia at step 706 may occur in response to the selection by the user to print the indicia. In additional or alternative embodiments, a user interface input component may be enabled at step 702 in response to the creating or modifying network access credentials according to the user input. This user interface input component may allow the user to make a selection to generate the indicia at step 704. Additionally, the printing of the indicia at step 706 may occur in response to the selection by the user to generate the indicia at step 704. In other embodiments, generating the indicia at step 704 and printing the indicia at step 706 may occur in response to creating and/or modifying network access credentials according to the user input at step 702.

Steps 704 and/or step 706 may include displaying the indicia. For example, in some embodiments, displaying the indicia may include transmitting the indicia to a router that implements the secured network connection, and that has an active display by which the indicia is displayed. Additionally or alternatively, the display may be accomplished by overwriting one or more router computer memory locations with data corresponding to the indicia. Such memory locations may be designated for containing data for display by the router on the active display. In some of embodiments, generation of the indicia in step 704 may occur in response to the creating and/or modifying network access credentials according to the user input in step 702, and the transmission of the indicia in step 706 may occur in response to the generation of the indicia in step 704.

In other embodiments, step 706 can include transmitting the indicia to a user specified destination. For example, additional user input may be received that specifies a destination corresponding to an email address and/or a telephone number. Thus, the indicia may alternatively or additionally be transmitted to one of these destinations by email and/or SMS.

Figure 8:
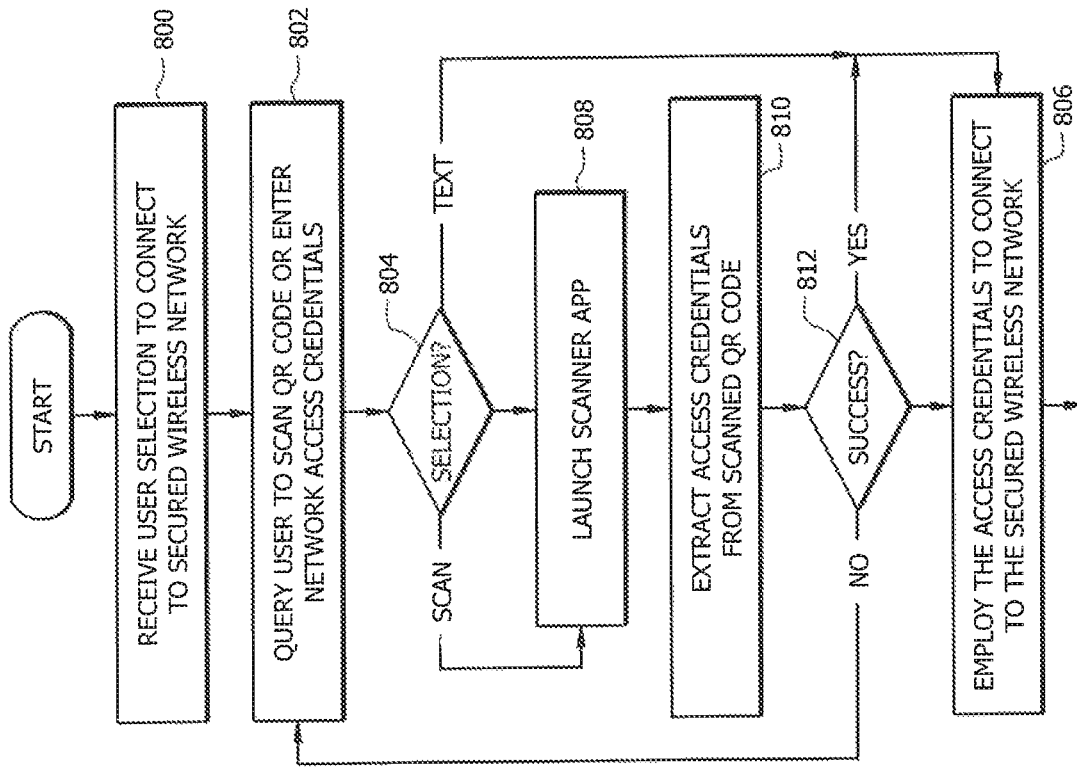
FIG. 8 is a flow diagram illustrating a method of establishing a secured network connection in accordance with the present disclosure.

FIG. 8 illustrates a method of establishing a secured network connection in accordance with the present disclosure. Starting at step 800, a user selection may be received to connect to a secured wireless network. Then, at step 802, a user query may prompt the user to scan an indicia or enter network access credentials manually. A user selection may be detected at step 804, and if the user has selected to manually enter the credentials, then these manually provided credentials may be employed at step 806 to establish the connection to the secured wireless network.

If it is detected at step 804 that the user has selected to scan an indicia, then an indicia scanning application can be launched at step 808, thus performing a scan of the indicia. Then, at step 810, network access credentials may be extracted from results of the scan. A determination may then be made at step 812 whether the extraction of network access credentials at step 810 proved successful. If it is determined at step 812 that the extraction proved successful, then these automatically extracted credentials may be employed at step 806 to establish the connection to the secured wireless network.

In some embodiments, launching the indicia scanning application at step 808 may occur in response to the selection by the user to scan the indicia at step 804. In additional embodiments, the prompting at step 802 may occur in response to the receiving the user selection to establish the connection at step 800. In further embodiments, the extracting at step 810 may include launching the indicia scanning application at step 808, and receiving the network access credentials from the indicia scanning application. In other embodiments, employing the network access credentials to establish the connection at step 806 may include establishing the connection for a mobile device, and performing the scan at step includes interfacing with a camera of the mobile device to scan the indicia. In still other embodiments, extracting the network access credentials at step 810 may include locating a password in the results of the scan and placing the password into a network password field of a user interface of a network connection application. In certain embodiments, it should be understood that the indicia can be a two-dimensional matrix code, such as a QR CODE™.

Figure 9:
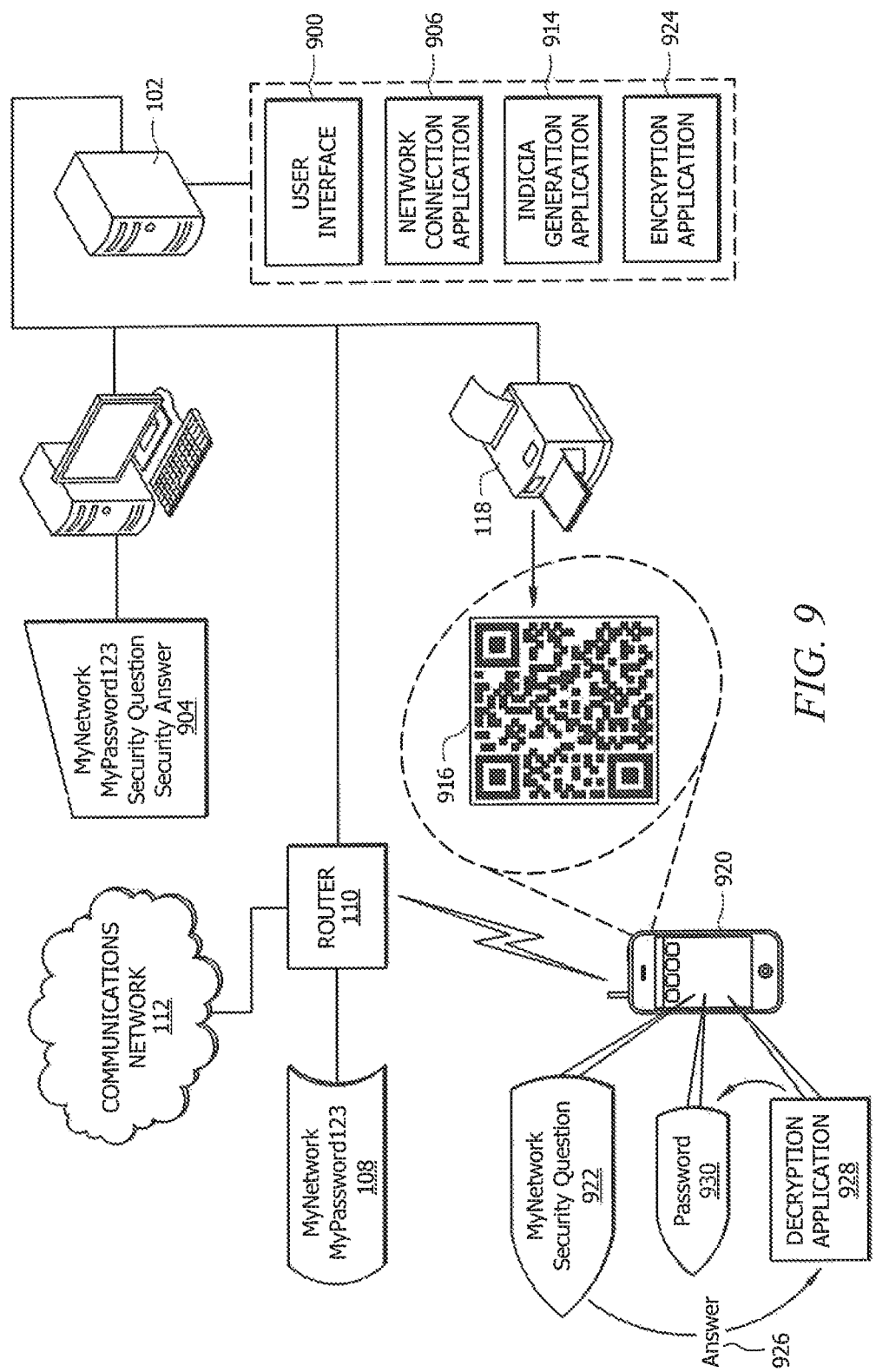
FIG. 9 is a functional block diagram illustrating another apparatus for generating indicia containing network access credentials in accordance with the present disclosure.

Turning now to FIG. 9, another apparatus for generating indicia containing network access credentials in accordance with the present disclosure may have several of the components of the previously described embodiment of FIG. 1, such as computer processor 102, network connection application 106, secured network access credentials 108, wireless router 110, communications network 112, and printer 118. However, user interface 900 causes the computer processor 102 to receive user input 904 providing an answer to a security question. User interface 900 may be configured to prompt the user to select a predefined security question, or to enter text that will serve as the security question. User interface 900 may require the user to enter text defining the answer to the security question. Indicia generation application 914 may cause the computer processor 102 to generate the code based indicia 916 to include the security question. Encryption application 924 may cause the computer processor 102 to employ the answer to the security question as an encryption key to encrypt at least part of the secured network access credentials, such as the password. Thus, indicia generation application 914 may generate the code-based indicia to include the encrypted password and the unencrypted security question and network ID. Then, end user device 920, upon scanning the indicia 916 may extract the encrypted password and the unencrypted security question, and render a display 922 of the security question to the user as a prompt for the user of device 920 to enter the answer to the security question. Upon receiving the answer 926, device 920 may utilize a decryption application 928 to employ the security answer 926 to decrypt the password and render a display 930 of the decrypted password. Alternatively or additionally, device 920 may automatically place the decrypted password into a password field of a network connection application, and utilize the decrypted password to establish a the network connection with the router 110.

In other embodiments, the network connection application may define the credentials 108 to include the encrypted password, and the indicia generation application 914 may generate the indicia 916 to include the unencrypted password. In these embodiments, the mobile device 920 can have an encryption application instead of decryption application. 928, or may operate decryption application 928 in reverse to accomplish encryption as will be readily understood. In other words, mobile device 920 may use the answer to the security question provided by the user of the mobile device 920 as an encryption key to encrypt the password extracted from results of the scan of indicia 916, and transmit the encrypted password to the wireless router to establish the connection. Accordingly, the display 922 may display to the user the unencrypted password that was automatically extracted from the results of the scan, and wireless router 110 can condition grant of network access on the received encrypted password matching the stored encrypted password.

Figure 10:
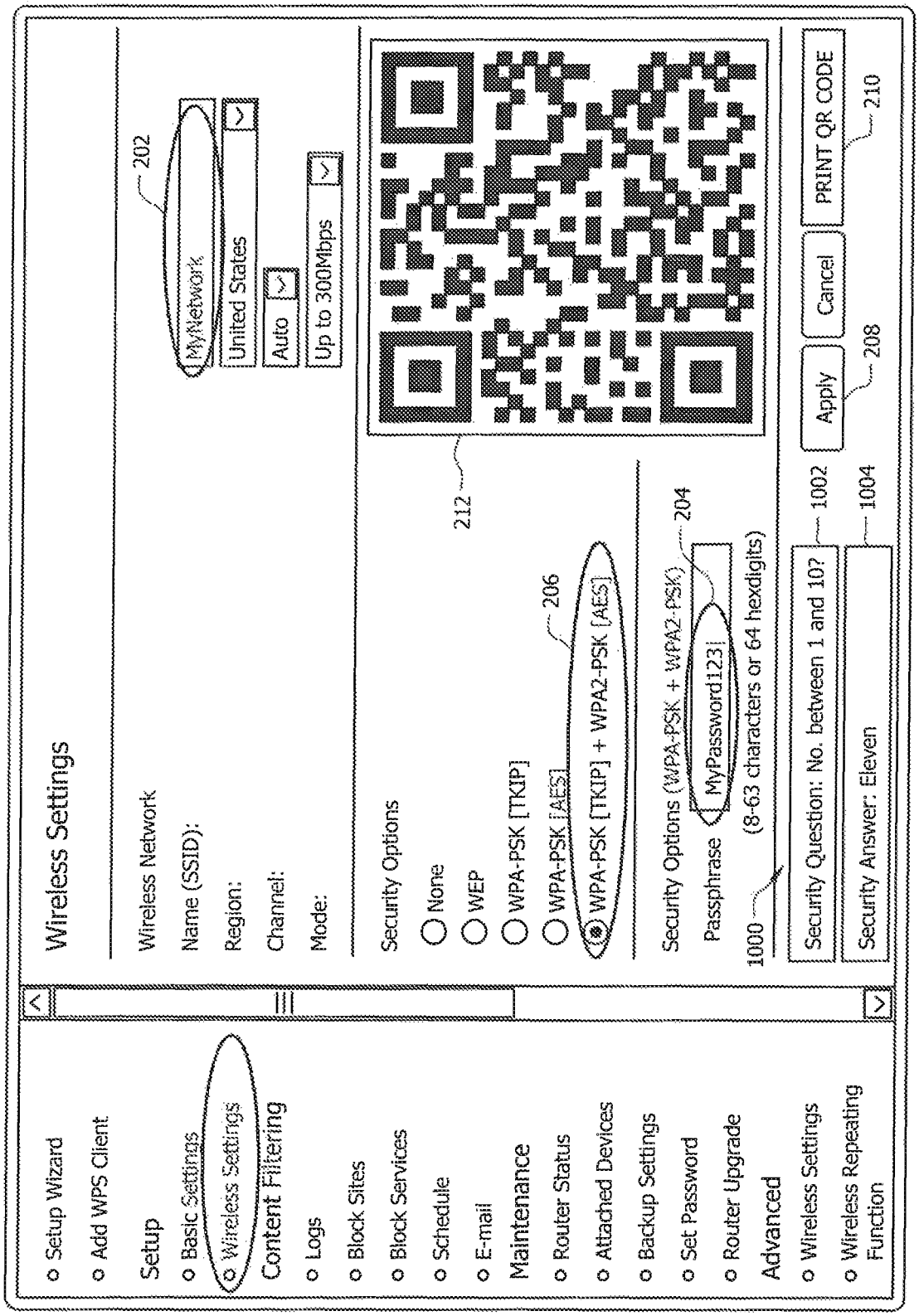
FIG. 10 is a graphical illustration presenting a view of another user interface of an apparatus for generating code-based indicia containing network access credentials in accordance with the present disclosure.

Turning now to FIG. 10, another user interface 1000 facilitates generation of code-based indicia containing network access credentials that include a security question, and that include a password encrypted using an answer to the security question as the encryption key. The user interface 1000 may have several of the components of the previously described embodiment of FIG. 2, such as network name 202, password 204, security option 206, credential creation/modification control 208, indicia generation/transmission control 210, and display region 212. Additionally, user interface 1000 may have a security question definition control 1002 that may prompt the user to select a predefined security question, or that may allow the user to enter text to define the security question. Also, user interface 1000 may have an answer definition control 1004 whereby the user provides textual input that defines the answer to the security question. In some embodiments, the user interface 1000 may prompt the user to define the security question and the answer upon user selection to define the credentials and/or generate the indicia. In other embodiments, the user interface my present the user with an option to define the security question and answer. Thus, the encryption of the password and inclusion of the security question in the indicia may be performed as an option available to the user. Contents of display region 212 may reflect this optional capability and/or provide other instructions relating to the security question and answer definition.

Figure 11:
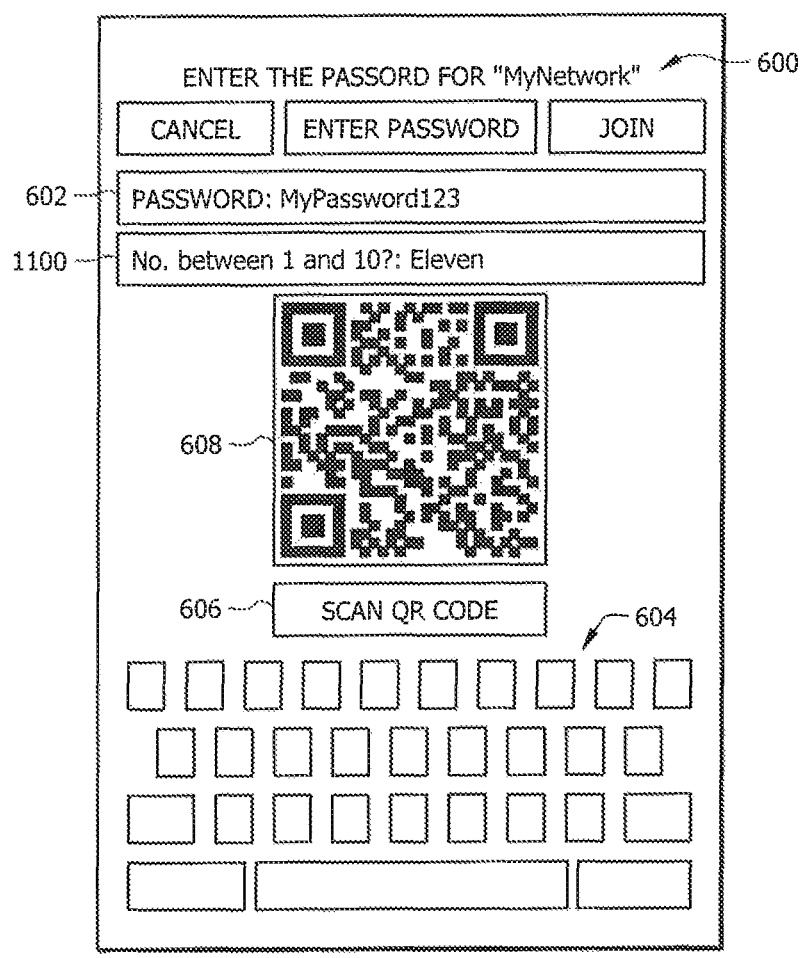
FIG. 11 is a graphical illustration presenting a view of another user interface of an apparatus for establishing a secured network connection in accordance with the present disclosure.

Turning now to FIG. 11, another user interface of an apparatus, such as a mobile device, for establishing a secured network connection may facilitate scanning of code-based indicia containing network access credentials that include a security question, and that include a password encrypted using an answer to the security question as the encryption key. The user interface may have several of the components of the previously described embodiment of FIG. 6, such as area 600, text field 602, keyboard 604, indicia scanning button 606, and display region 608. In addition, the security question extracted from the results of the scan may be automatically placed in an answer definition control 1100 as a prompt, and the user may enter text in the control 1100 to define the answer. Upon entering the text in control 1100, the encrypted password extracted from results of the scan may be decrypted using the entered answer as the decryption key, and the decryption results may be placed automatically in text field 602. This decrypted password may then be transmitted to the router to attempt to establish the connection. If unsuccessful, then the user may be prompted to enter the password manually via text field 602, perform a rescan of the same or different indicia via button 602, or enter a different answer to the security question via control 1100. Contents of display region 608 may contain instructions regarding these options.

FIG. 12 illustrates another method of generating code-based indicia containing secured network access credentials in accordance with the present disclosure. Beginning at step 1200, user input is received that specifies secured network access credentials, such as a name and password for the secured network connection, a security question, and an answer to the security question. Then, at step 1202, secured network access credentials are created and/or modified according to the user input. For example, a new network ID and password, such as a WEP key or the like, may be transmitted to a network router and stored therein as the credentials needed to gain access to the network via the router and establish a network connection via the router. Additionally, at step 1204, a password of the credentials may be encrypted using the answer to the security question as an encryption key. Also, at step 1206, code-based indicia are generated that contain at least part of the secured network access credentials. For example, the keywords "Name," "Password," and "Security Question" may be used to tag the credentials, and the tagged text may be encoded into indicia, such as a QR CODE™. Then, at step 1208, the indicia may be printed and/or transmitted.

In other embodiments, step 1204 may be carried out to encrypt the password before the credentials are created at step 1202. In these embodiments, the encrypted password may be included in the credentials transmitted and stored in the wireless router at step 1202, and the unencrypted password may be included in the code-based indicia generated at step 1206. For these embodiments, a mobile device attempting to establish a connection to the router may use the security answer provided by the user of the mobile device as an encryption key to encrypt the password, and transmit the encrypted password to the wireless router to establish the connection.

In some embodiments, a user interface input component may be enabled at step 1206 in response to the generating the indicia. This user interface input component may allow the user to make a selection to print the indicia, and the printing of the indicia at step 1208 may occur in response to the selection by the user to print the indicia. In additional or alternative embodiments, a user interface input component may be enabled at step 1202 in response to the creating or modifying network access credentials according to the user input. This user interface input component may allow the user to make a selection to generate the indicia at step 1204. Additionally, the printing of the indicia at step 1208 may occur in response to the selection by the user to generate the indicia at step 1206. In other embodiments, generating the indicia at step 1206 and printing the indicia at step 1208 may occur in response to creating and/or modifying network access credentials according to the user input at step 1202.

Steps 1206 and/or step 1208 may include displaying the indicia. For example, in some embodiments, displaying the indicia may include transmitting the indicia to a router that implements the secured network connection, and that has an active display by which the indicia is displayed. Additionally or alternatively, the display may be accomplished by overwriting one or more router computer memory locations with data corresponding to the indicia. Such memory locations may be designated for containing data for display by the router on the active display. In some of embodiments, generation of the indicia in step 1206 may occur in response to the creating and/or modifying network access credentials according to the user input in step 1202, and the transmission of the indicia in step 1208 may occur in response to the generation of the indicia in step 1206.

In other embodiments, step 1206 may include transmitting the indicia to a user specified destination. For example, additional user input may be received that specifies a destination corresponding to an email address and/or a telephone number. Thus, the indicia may be alternatively or additionally transmitted to one of these destinations by email and/or SMS.

FIG. 13 illustrates another method of establishing a secured network connection in accordance with the present disclosure. Starting at step 1300, a user selection may be received to connect to a secured wireless network. An indicia scanning application may be launched at step 1302, thus performing a scan of the indicia. In some embodiments, the scanning application can be launched automatically, while other embodiments may launch the scanning application in response to a user selection as previously described. Then, at step 1304, network access credentials may be extracted from results of the scan. For example, an encrypted password and unencrypted security question may be extracted. Then, at step 1306, the security question may be used to prompt the user, and the answer to the security question may be received at step 1308. The answer may then be used at step 1310 as a decryption key to decrypt the password, and the decrypted password may be used at step 1312 to connect to the secured wireless network in the manner previously described. If a determination is made at step 1314 that the connection is not successful, the processing may return to an earlier step in the process, such as step 1306 or step 1300.

Figure 14:
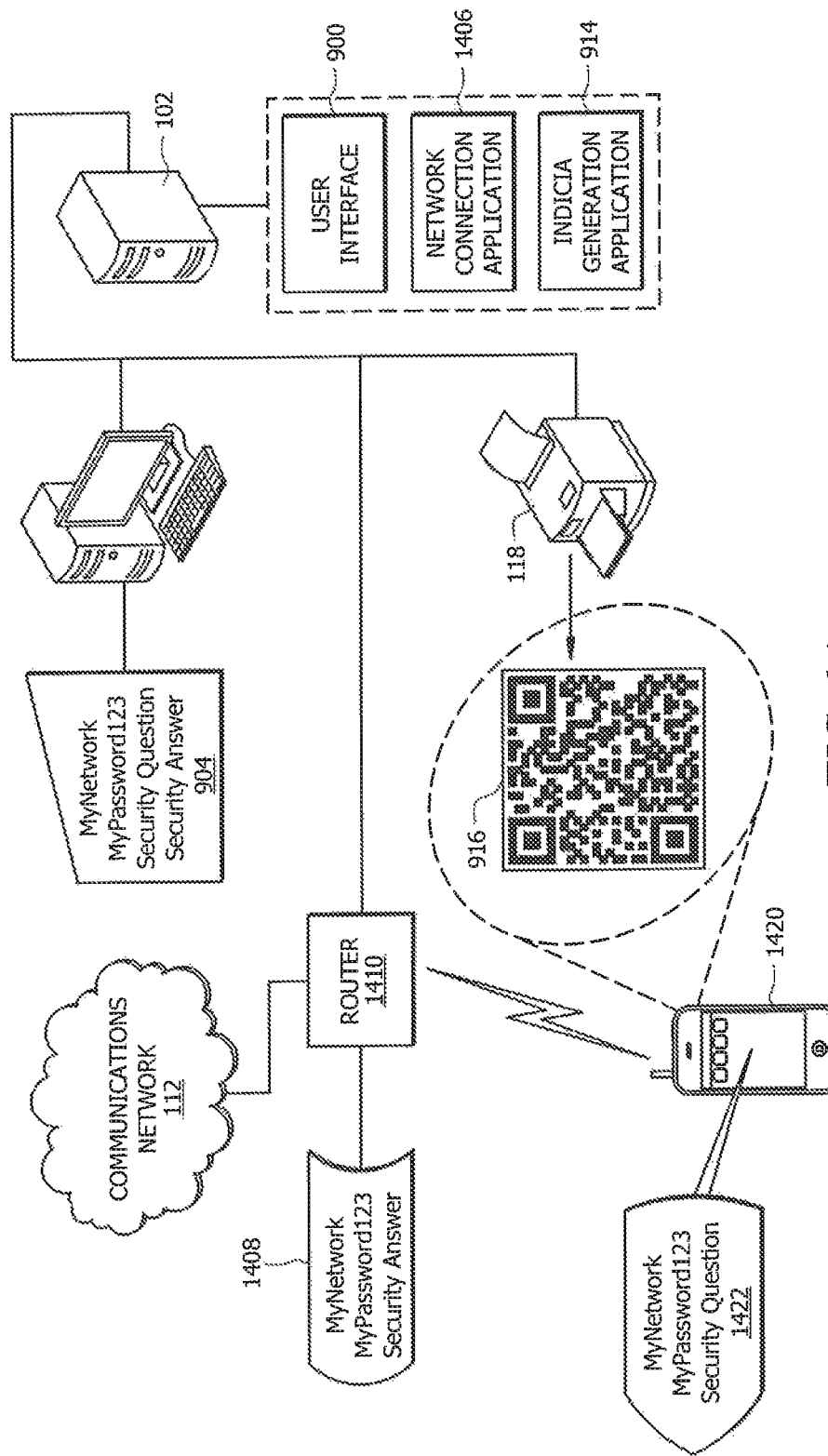
FIG. 14 is a functional block diagram illustrating an additional apparatus for generating indicia containing network access credentials in accordance with the present disclosure.

FIG. 14 illustrates an additional apparatus for generating indicia containing network access credentials, and it may have several of the components of the previously described embodiment of FIG. 9, such as user interface 900, computer processor 102, user input 904, communications network 112, indicia generation application 914, code-based indicia 916, and printer 118, However, network connection application 1406 defines the secured network access credentials 1408 in wireless router 1410 to include the answer to the security question. In order to grant access to the network, the wireless router 1410 may require receipt of the password (e.g., WEP key or the like) in addition to receipt of the answer to the security question. End user device 1420, upon scanning the indicia 916 may extract the password and the security question, and render a display 1422 of the password and additionally display the security question to the user as a prompt for the user of device 1420 to enter the answer to the security question. Upon receiving the answer, device 1420 may transmit, to the wireless router 1410, the password and the answer to the security question. The wireless router 1410 may make a determination whether the received password and answer match those stored in memory, and condition grant of access to the network on determination of a successful match. In this manner, mobile device 1420 may establish the network connection with the wireless router 1410.

Figure 15:
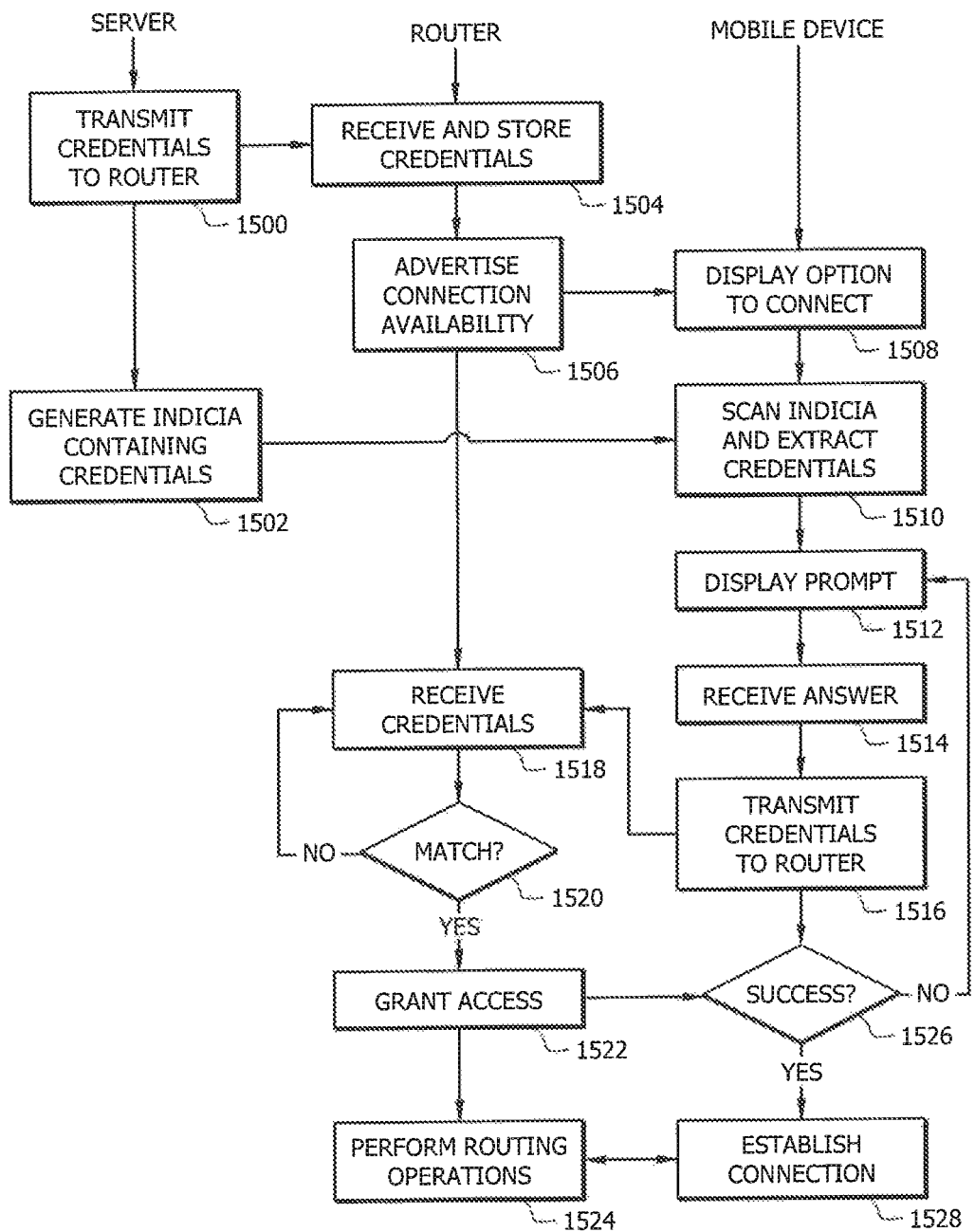
FIG. 15 is a flow diagram illustrating additional methods of establishing a secured network connection in accordance with the present disclosure.

FIG. 15 illustrates additional methods of establishing a secured network connection in accordance with the present disclosure. A server may carry out transmission of credentials to a router at step 1500, wherein the credentials may include a password and an answer to a security question, as described above. At step 1502, the server may also generate the indicia containing the credentials, including the password and the security question. At step 1504, a router may receive and store the credentials transmitted at step 1500, and advertise availability of a wireless network connection at step 1506. At step 1508, a mobile device may detect the wireless network connection availability and display an option to connect to the wireless network. At step 1510, the mobile device may then scan the indicia generated by the server at step 1502, and extract the credentials from results of the scan. For example, a password and a security question may be extracted by recognizing tags in textual data, and selecting the tagged text for extraction accordingly. At step 1512, the mobile device may display the security question as a prompt, and receive an answer to the security question at step 1514. The extracted password and the received answer may then be transmitted to the router at step 1516. Upon receiving the credentials at step 1518, the router may make a determination, at step 1520, whether the received password and the received answer to the security question match the respective credentials stored in memory of the router. If the determination is made that the credentials are not a match, then the router operation process may return to an earlier step in the process, such as step 1518. Otherwise, the router may grant access to the mobile device at step 1522, and perform routing operations for the established connection at step 1524. In turn, the mobile device may determine whether the attempt to gain access was successful at step 1526, and establish the connection at step 1528 in the event of success. Otherwise, the mobile device operation process may return to an earlier step, such as step 1512.

Figure 16:
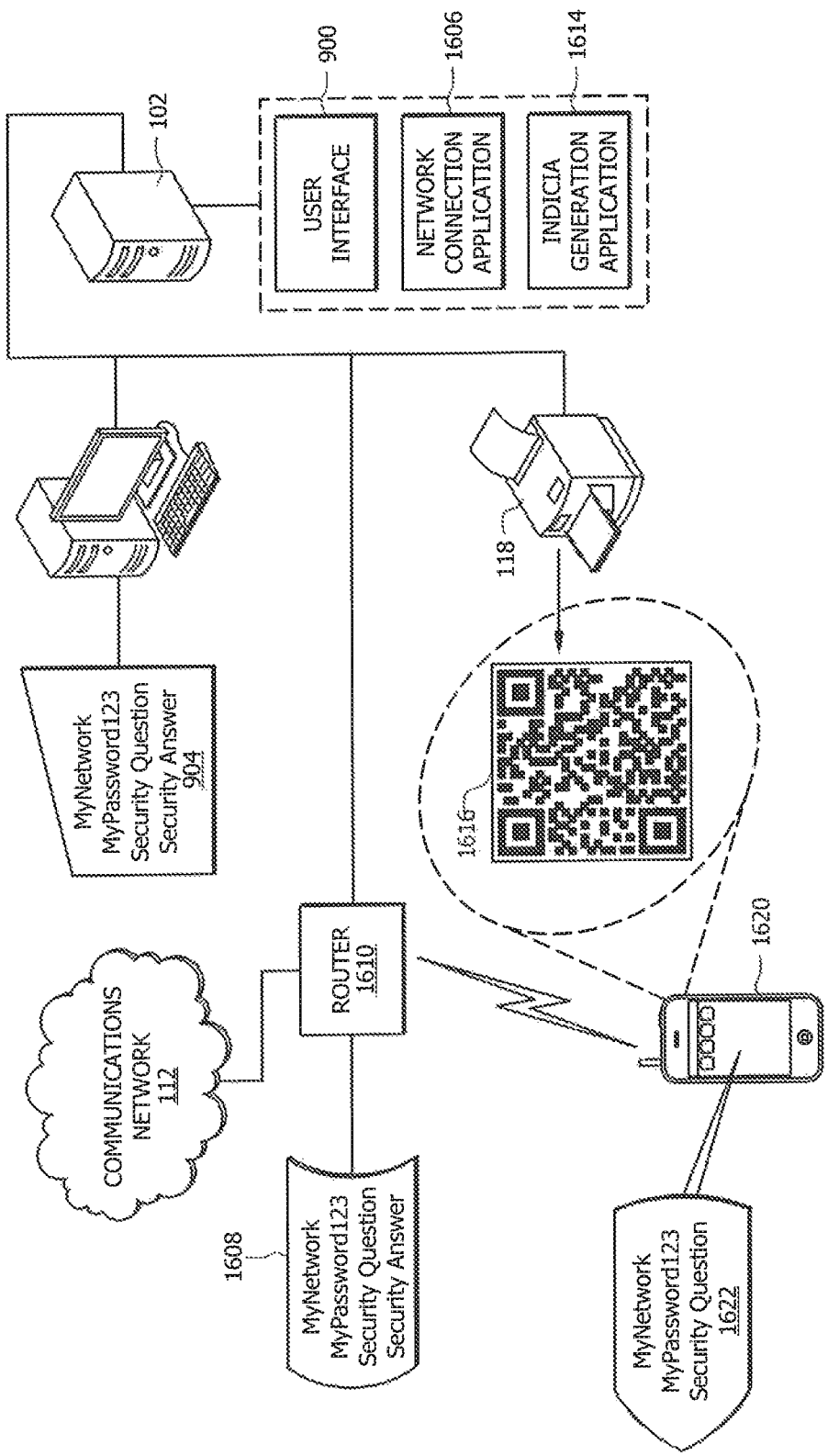
FIG. 16 is a functional block diagram illustrating yet another apparatus for generating indicia containing network access credentials in accordance with the present disclosure.

FIG. 16 illustrates an additional apparatus for generating indicia containing network access credentials, and it may have several of the components of the previously described embodiment of FIG. 14, such as user interface 900, computer processor 102, user input 904, communications network 112, and printer 118. However, network connection application 1606 may define the secured network access credentials 1608 in wireless router 1610 to include the security question and the answer to the security question. Also, indicia generation application 1614 may generate the code-based indicia 1616 to include the network ID and password, but not the security question or the answer to the security question. In order to grant access to the network, the wireless router 1610 may require receipt of the password (e.g., WEP key or the like) in addition to receipt of the answer to the security question. End user device 1620, upon scanning the indicia 1616, may extract the password, render a display 1622 of the password, and transmit the password to the wireless router 1610. Upon receiving the password and making a determination of a match to the password stored in memory, the wireless router may respond by transmitting the security question to the mobile device 1620. The mobile device may then render the display 1622 of the received security question as a prompt for the user of device 1620 to enter the answer to the security question. Upon receiving the answer, device 1620 may transmit, to the wireless router 1610, the answer to the security question. The wireless router 1610 may determine whether the received answer matches the answer stored in memory, and condition grant of network access on determination of a successful match. In this manner, the mobile device 1620 may establish a connection with the wireless router 1610.

Figure 17:
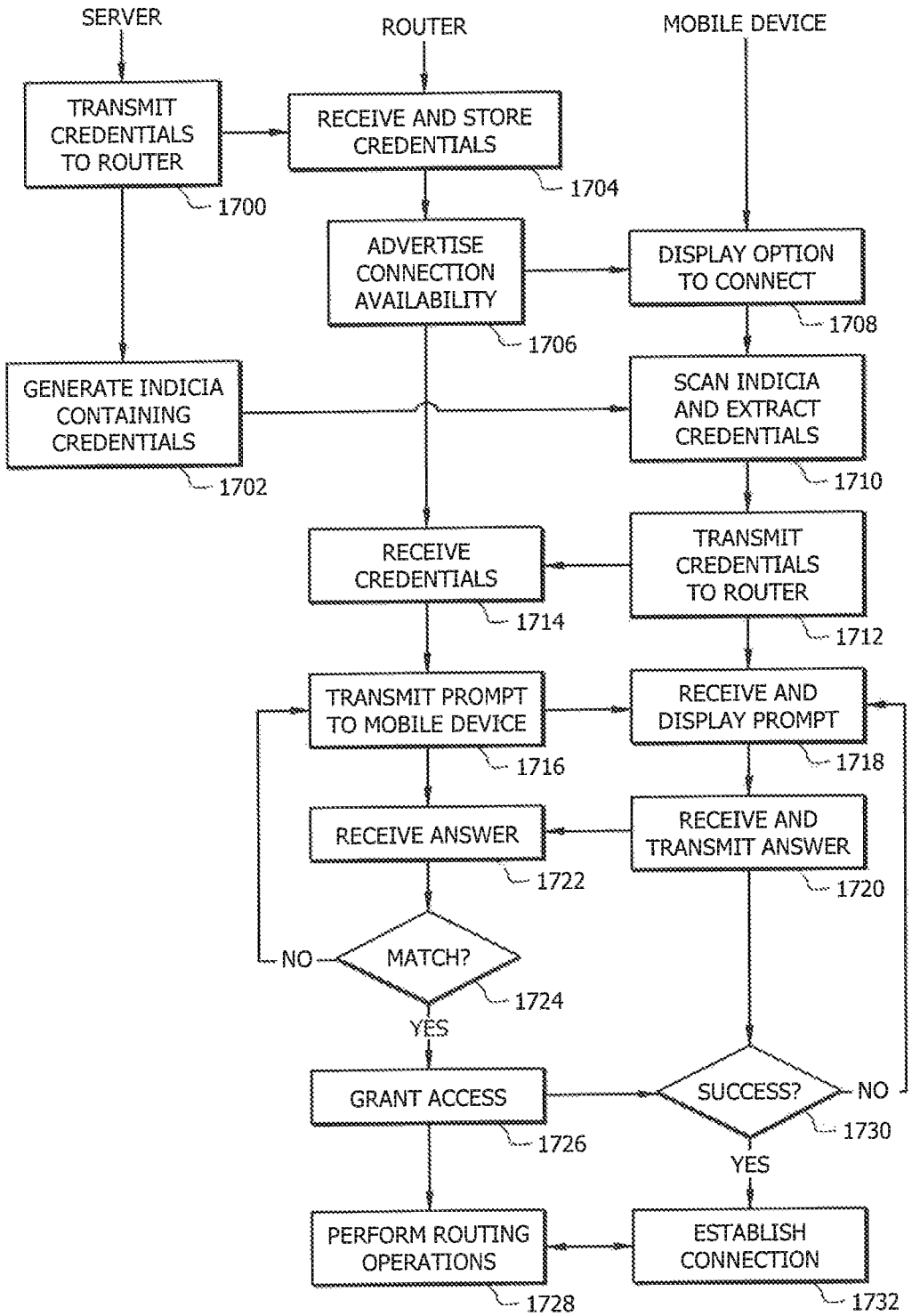
FIG. 17 is a flow diagram illustrating further methods of establishing a secured network connection in accordance with the present disclosure.

FIG. 17 illustrates additional methods of establishing a secured network connection in accordance with the present disclosure. A server may carry out transmission of credentials to a router at step 1700, wherein the credentials may include a password, a security question, and an answer to the security question, as described above. At step 1702, the server may also generate the indicia containing the credentials, including the password, but not including the security question or the answer to the security question. At step 1704, a router may receive and store the credentials transmitted at step 1700, and advertise availability of a wireless network connection at step 1706. At step 1708, a mobile device may detect the wireless network connection availability and display an option to connect to the wireless network. At step 1710, the mobile device may then scan the indicia generated by the server at step 1702, and extract the credentials from results of the scan. For example, a password may be extracted by recognizing tags in textual data, and selecting the tagged text for extraction accordingly. Upon receiving the credentials at step 1714, the router may make a determination, whether the received password matches the respective credentials stored in memory of the router. If the determination is made that the credentials are not a match, then the router operation process may return to an earlier step in the process, such as step 1706. Otherwise, at step 1716, the router may transmit the security question to the mobile device as a prompt. At step 1718, the mobile device may receive and display the security question as a prompt to the user. At step 1720, the mobile device may receive an answer to the security question and transmit it to the router. Upon receiving the answer at step 1722, the router may make a determination, at step 1724, whether the received answer to the security question matches the respective credentials stored in memory of the router. If the determination is made that the answers are not a match, then the router operation process may return to an earlier step in the process, such as step 1716. Otherwise, the router may grant access to the mobile device at step 1726, and perform routing operations for the established connection at step 1728. In turn, the mobile device may determine whether the attempt to gain access was successful at step 1730, and establish the connection at step 1732 in the event of success. Otherwise, the mobile device operation process may return to an earlier step, such as step 1718.

Figure 18:
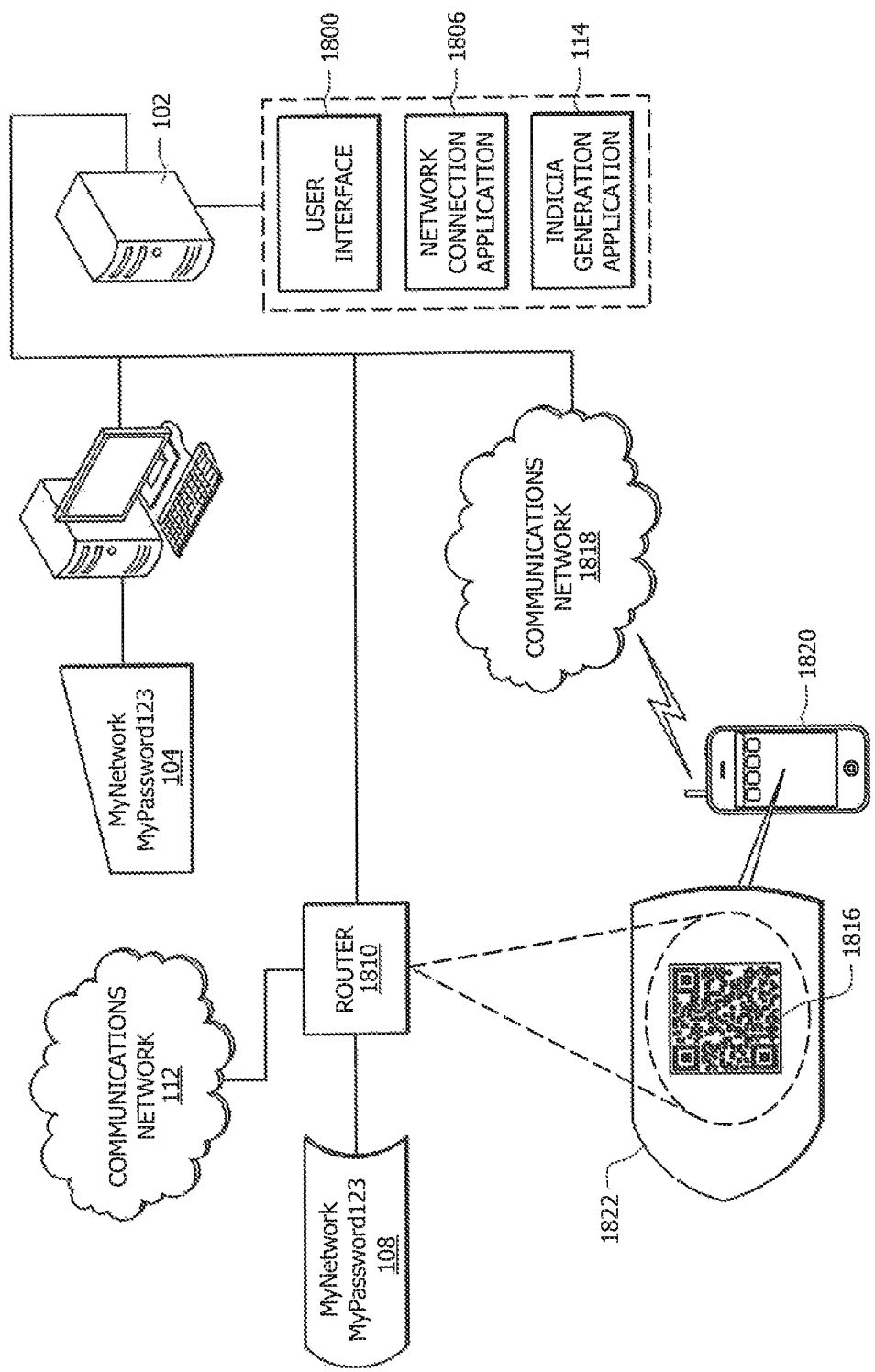
FIG. 18 is a functional block diagram illustrating yet another apparatus for generating indicia containing network access credentials in accordance with the present disclosure.

FIG. 18 illustrates yet another apparatus for generating indicia containing network access credentials, and it may have several of the components of the previously described embodiment of FIG. 1, such as computer processor 102, user input 104, credentials 108, communications network 112, and indicia generation application 114. However, user interface 1800, though similar to the embodiment of FIG. 2, may have instructions and controls for causing network connection application 1806 to transmit the indicia 1816 to a mobile device 1820 by a communications network 1818. For example, the indicia 1816 may be transmitted to mobile device 1820 and stored in memory thereof via picture message over a cellular network, in order to grant access to the network, the router 1810 may require, or offer the user the option, to scan a display 1822 of the indicia 1822 via a camera of the router 1810. The router 1810 may have the scanning software and credential extraction application to extract credentials from results of the scan, and use those credentials to grant the mobile device 1820 access to the secured network 112. It should be understood that, in additional or alternative embodiments, the security question and answer can be implemented as previously described, and the router 1810 may prompt the user of the mobile device to supply the answer to the security question as previously described. Moreover, it is envisioned that the router 1810 may prompt the user via the mobile device 1820, via a display of the router 1810, and/or via a speaker of the router 1810. It is further envisioned that the router 1810 may receive the answer by text entry from the mobile device 1820, or by speech via a microphone of the mobile device 1820 and/or of the router 1810. These features and options may further be implemented in any or all of the embodiments previously described.

Figure 19:
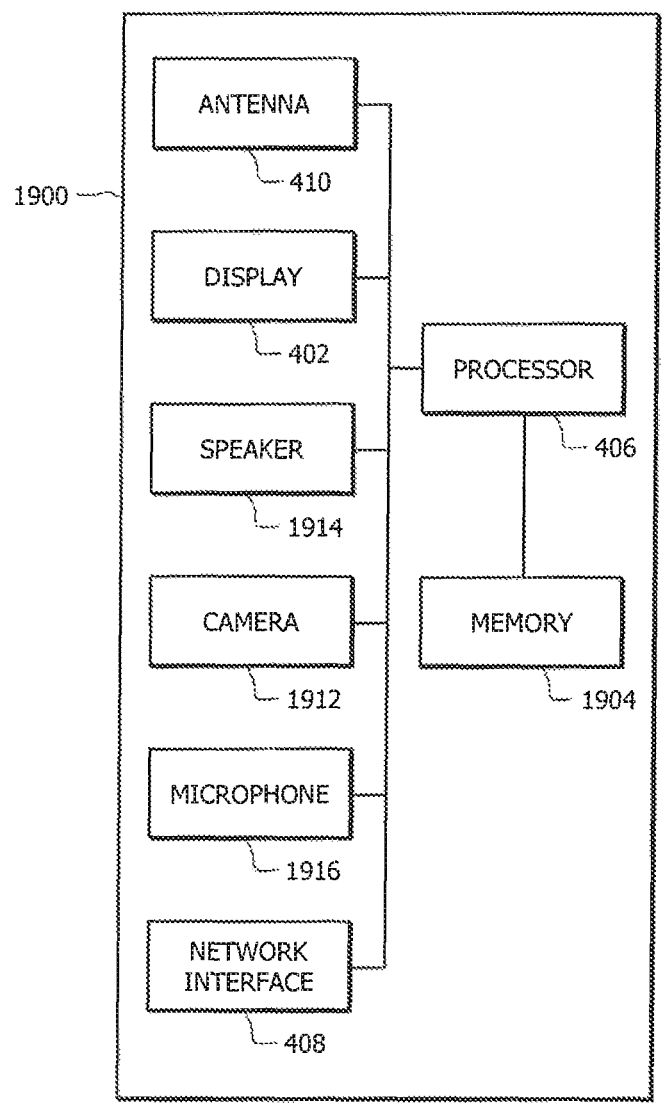
FIG. 19 is a functional block diagram illustrating a router capable of scanning code-based indicia containing network access credentials in accordance with the present disclosure.

FIG. 19 illustrates another router 1900 having a camera 1902 or other imaging apparatus in accordance with the present disclosure. The router 1900 may additionally have components similar to those of the router described above with reference to FIG. 4, including display 402, processor 406, network interface 408, and antenna 1410. Memory 1904 of the router 1900 may store an application run by the computer processor 406 of the router 1900 to respond to a mobile device attempting to establish a connection. The application may cause the processor to operate camera 1912 to perform a scan of indicia, extract credentials from results of the scan, match the extracted credentials to credentials stored in memory 1904, and grant access to the device if the match is successful. It is envisioned that, in additional or alternative embodiments, the security question and answer can be implemented as previously described, and the router 1900 may prompt the user of the mobile device to supply the answer to the security question as previously described. Moreover, it is envisioned that the router 1900 may prompt the user via the mobile device, via display 402 of the router 1900, and/or via a speaker 1914 of the router 1900. It is further envisioned that the router 1900 may receive the answer by text entry from the mobile device, or by speech via a microphone 1916 of the router 1900 and/or of the mobile device. These features and options may further be implemented in any or all of the embodiments previously described.

Figure 20:
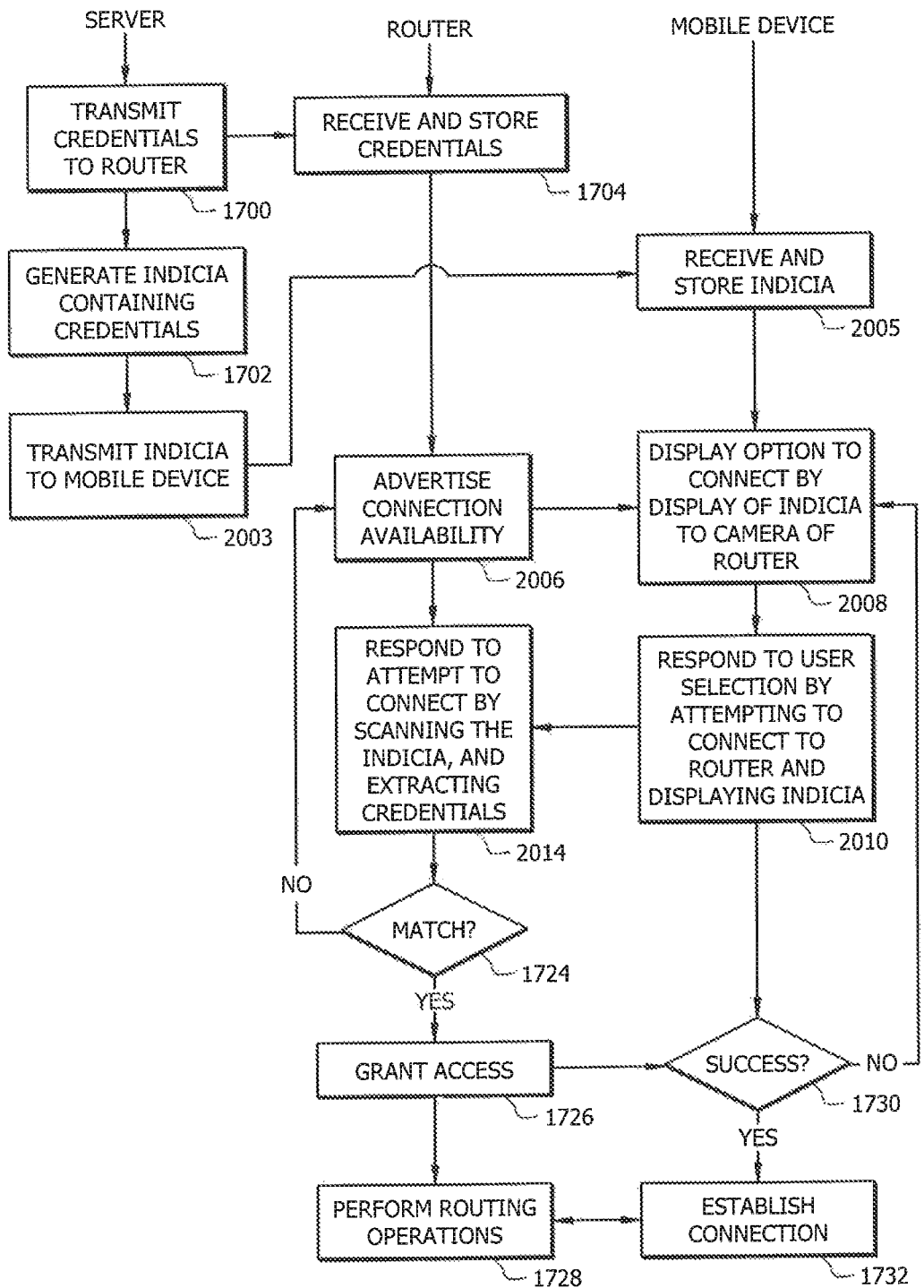
FIG. 20 is a flow diagram illustrating yet further methods of establishing a secured network connection in accordance with the present disclosure.

FIG. 20 illustrates additional methods of establishing a secured network connection in accordance with the present disclosure. These methods may have steps similar to those described with respect to FIG. 17, such as steps 1700-1704 and steps 1724-1732. However, at step 2003, the server may transmit the code-based indicia to the mobile device, and the mobile device may receive and store in memory the code-based indicia at step 2005. At step 2006, the router may advertise connection availability, and this advertisement may include a notification of an ability of the router to perform an authentication process at step 2014 by which the router may scan indicia and extract credentials.

At step 2008, the mobile device can display a user selectable option to connect by display, on the mobile device, of the code-based indicia to a camera of the router. This option may be displayed in addition to other connection options, such as those described in additional or alternative embodiments described herein. Instructions displayed in a display region of the mobile device may conditionally inform the user of this option based on storage in the mobile device of the code-based indicia, and based on capability of the router to perform the process at step 2014. For example, the mobile device may make a determination whether the router is capable of performing the scan, and make a determination whether there are code-based indicia stored in memory of the mobile device that contain credentials for a network ID that matches a network ID of a connection provided by the router. Then, display on the active display of mobile device of a user-selectable option to establish the connection by displaying the indicia to an imaging device of the router may be conditioned on results of these determinations.

At step 2010, the mobile device may respond to user selection of the option by transmitting a notification to the router that it wishes to connect via the process 2014, and by rendering the code-based indicia on an active display of the mobile device. In some embodiments, the mobile device may first prompt the user to provide an answer to a security question, and include the answer to the security question with the notification. In other embodiments, the router my prompt the user to provide the answer via a speaker. It is also envisioned that the answer may be provided as speech to a microphone of the router or the mobile device, and that either the router or the mobile device may employ speech recognition to obtain the answer. Speaker authentication may optionally be performed by the router and/or mobile device. At step 2014, the router may respond to the notification received from the mobile device by performing the scanning and extraction procedure using an imaging device of the router. In some embodiments, this response of the router may be conditioned on an answer to a security question provided with the notification matching an answer stored in memory if the router.

Further instructions may be delivered to the user during the routers scanning and authentication process to assist in the scanning of the indicia, and these instructions may be delivered by a display of the router and/or a speaker of the mobile device or the router. For example, a countdown may be provided, and the user may be notified when the scan is completed or has timed out. Alternatively or additionally, the display of the router may render the image being captured by the imaging device of the router in real time, thus guiding the user to position the display of the code-based indicia for accurate scanning. Once scanning has occurred and extraction completed, Steps 1724-1732 may then occur as previously described with respect to FIG. 17, except that failure to find a match or successfully scan may cause the processes to return to steps 2006 and 2008 for another attempt, or for a different option to be exercised by the user of the mobile device. Additionally, it is envisioned that a security question may be employed at this stage, in which case steps 1716-1722 may also be included in the manner previously described with respect to FIG. 17.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of establishing a secured network connection, the method comprising:
   performing a scan, by a computer processor, of code-based indicia containing network access credentials for establishing the secured network connection, wherein the code-based indicia corresponds to a two-dimensional matrix code and the network access credentials include encrypted network access credentials, a security question and a network identifier;
   extracting the network access credentials, by the computer processor, from results of the scan;
   receiving a user input indicating an answer to the security question responsive to initiating display of the security question;
   decrypting, by the computer processor, the encrypted network access credentials based on the answer; and
   employing at least the decrypted network access credentials, by the computer processor, to establish the secured network connection by initiating transmission of the decrypted network access credentials to a network device corresponding to the network identifier.

2. The method of claim 1 where performing the scan includes launching an indicia scanning application.

3. The method of claim 2 further comprising:
   prompting a user to make a selection to scan code-based indicia containing the network access credentials for establishing the secured network connection.

4. The method of claim 3 where the launching the indicia scanning application occurs in response to the selection by the user to scan the code-based indicia.

5. The method of claim 3 further comprising:
   receiving a user selection to establish the secured network connection,
   where the prompting occurs in response to the receiving the user selection to establish the secured network connection.

6. The method of claim 1 where employing at least the decrypted network access credentials to establish the secured network connection includes establishing the secured network connection for a mobile device, and where performing the scan includes interfacing with a camera of the mobile device to scan the code-based indicia.

7. The method of claim 1 where extracting the network access credentials includes locating a password in the decrypted network access credentials and placing the password into a network password field of a user interface of a network connection application.

8. The method of claim 1 wherein the network identifier is a non-encrypted network identifier, and wherein the non-encrypted network identifier is employed to establish the secured network connection.

9. The method of claim 8, where the decrypted network access credentials comprises a password.

10. The method of claim 9, where employing the decrypted network access credentials and the non-encrypted network identifier to establish the secured network connection includes transmitting the password to a network device associated with the non-encrypted network identifier.

11. A network apparatus comprising:
    one or more processors;
    a non-transitory memory communicatively coupled to the one or more processors; and
    an imaging device communicatively coupled to the one or more processors, where the non-transitory memory is configured to store instructions that, when executed by the one or more processors, cause the one or more processors to:
    capture, using the imaging device, code-based indicia containing network access credentials for establishing a secured network connection, wherein the code-based indicia corresponds to a two-dimensional matrix code and the network access credentials include encrypted network access credentials, a security question and a network identifier;
    extract the network access credentials from results of the capture;
    receive a user input indicating an answer to the security question responsive to initiating display of the security question;
    decrypt the encrypted network access credentials based on the answer; and
    employ at least the decrypted network access credentials to establish the secured network connection by initiating transmission of the decrypted network access credentials to a network device corresponding to the network identifier.

12. The network apparatus of claim 11, further comprising:
    a network interface coupled to a communications network, where establishing the secure network connection comprises transmitting, from the network interface, the decrypted network access credentials to a network device.

13. The network apparatus of claim 11, further comprising:
- a display device coupled to the one or more processors and configured to display the security question; and
- a user interface configured to receive the user input.

14. The network apparatus of claim 11, where the instructions, when executed by the one or more processors, further cause the one or more processors to decrypt the encrypted network access credentials based on the answer prior to establishment of the secured network connection.

\* \* \* \* \*